(12) United States Patent
Franklin et al.

(10) Patent No.: US 11,085,809 B1
(45) Date of Patent: Aug. 10, 2021

(54) MULTI-CHANNEL WEIGHT SENSING SYSTEM

(71) Applicant: AMAZON TECHNOLOGIES, INC., Seattle, WA (US)

(72) Inventors: Nicholas Franklin, Maple Valley, WA (US); Paul Eugene Munger, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 128 days.

(21) Appl. No.: 16/208,370

(22) Filed: Dec. 3, 2018

(51) Int. Cl.
| | |
|---|---|
| G01G 21/22 | (2006.01) |
| G01G 21/23 | (2006.01) |
| G06Q 10/08 | (2012.01) |
| G01G 3/14 | (2006.01) |

(52) U.S. Cl.
CPC ........... *G01G 3/1402* (2013.01); *G01G 21/22* (2013.01); *G01G 21/23* (2013.01); *G06Q 10/087* (2013.01)

(58) Field of Classification Search
CPC ...... G01G 3/1402; G01G 21/22; G01G 21/23; G06Q 10/087
USPC ........................................................ 177/211
See application file for complete search history.

(56) References Cited

U.S. PATENT DOCUMENTS

| | | | |
|---|---|---|---|
| 6,246,052 B1 * | 6/2001 | Cleveland | ............... B82Y 35/00 250/234 |
| 7,225,980 B2 | 6/2007 | Ku et al. | |
| 7,949,568 B2 | 5/2011 | Fano et al. | |
| 8,009,864 B2 | 8/2011 | Linaker et al. | |
| 8,189,855 B2 | 5/2012 | Opalach et al. | |
| 8,201,737 B1 * | 6/2012 | Palacios Durazo | .. G06Q 10/087 235/383 |
| 8,630,924 B2 | 1/2014 | Groenevelt et al. | |
| 9,235,928 B2 | 1/2016 | Medioni et al. | |
| 9,473,747 B2 | 10/2016 | Kobres et al. | |
| 10,121,121 B1 * | 11/2018 | De Bonet | ............ G01G 19/414 |

(Continued)

OTHER PUBLICATIONS

Asthana, et al. "An Indoor Wireless System for Personalized Shopping Assistance" CiteSeerX, in Proceedings of IEEE Workshop on Mobile Computing Systems and Applications, 1994. Retrieved from the Internet: http://citeseerx.ist.psu.edu/viewdoc/summary?doi=10.1.1.127.3033&rank=1.

(Continued)

*Primary Examiner* — Jacques M Saint Surin
(74) *Attorney, Agent, or Firm* — Lindauer Law, PLLC

(57) ABSTRACT

A device comprises a crossmember. The crossmember is supported by one or more weight sensors, such that a total weight of the crossmember and any supported load may be measured. One or more strain gauges are affixed to the crossmember. An accessory may comprise a portion to support an inventory item, such as a hook, shelf, bin, basket, and so forth. The accessory also includes an engagement feature to mechanically engage a portion of the crossmember. Several accessories may be engaged to the crossmember. As the load on the accessory changes, such as due to a pick or place of items, a total weight change may be determined by summing the output from the weight sensors. Data from the strain gauges may be used to allocate the total weight change to a particular accessory, allowing for the determination of the weight change for that particular accessory.

20 Claims, 11 Drawing Sheets

(56) References Cited

U.S. PATENT DOCUMENTS

| | | | |
|---|---|---|---|
| 2008/0302747 A1* | 12/2008 | Nance | F16B 12/28 211/183 |
| 2009/0222359 A1* | 9/2009 | Henry | G06Q 10/087 705/28 |
| 2011/0011936 A1 | 1/2011 | Morandi et al. | |
| 2012/0284132 A1 | 11/2012 | Kim et al. | |
| 2013/0284806 A1 | 10/2013 | Margalit | |
| 2015/0086107 A1 | 3/2015 | Dedeoglu et al. | |
| 2016/0252390 A1* | 9/2016 | Batsikouras | G01G 19/52 177/25.13 |
| 2018/0128667 A1* | 5/2018 | Loftin | G01F 17/00 |

OTHER PUBLICATIONS

Kalnikaite, et al., "How to Nudge in Situ: Designing Lambent Devices to Deliver Information Salience in Supermarkets", ACM, In proceeding of UbiComp 2011:Ubiquitous Computing, 13th International Conference, UbiComp 2011, Beijing, China, Sep. 17-21, 2011, 10 pages. Retrieved from the Internet: http://www.researchgate.net/publication/221568350_How_to_nudge_in_Situ_designing_lambert_devices_to_deliver_salient_information_in_supermarket.

Pop, Cristian, "Introduction to the BodyCom Technology" AN1391, DS01391A, Microchip Technology, Inc., May 2, 2011. Retrieved from the Internet: http://www.microchip.com//wwwAppNotes/AppNotes.aspx?appnote=en555156.

Vu, et al., "Distinguishing Users with Capacitive Touch Communication" WINLAB, Rutgers University, In proceedings of: The 18th Annual international Conference on Mobile computing and networking. pp. 197-208. Aug. 2012. Retrieved from the Internet: http://www.winlab.rutgers.edu/-janne/capacitivetouch_mobicom12.pdf.

\* cited by examiner

MULTI-CHANNEL WEIGHT SENSING SYSTEM

BACKGROUND

Retailers, wholesalers, and other product distributors typically maintain an inventory of various items that may be ordered, purchased, leased, borrowed, rented, viewed, and so forth, by clients or customers. For example, inventory may be stored and distributed from a fulfillment center. When a customer orders an item, the item is picked from inventory, routed to a packing station, packed, and shipped to the customer. Likewise, retail stores maintain inventory in customer accessible areas, such as in a shopping area, and customers can pick items from inventory and take for purchase, rental, and so forth. Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
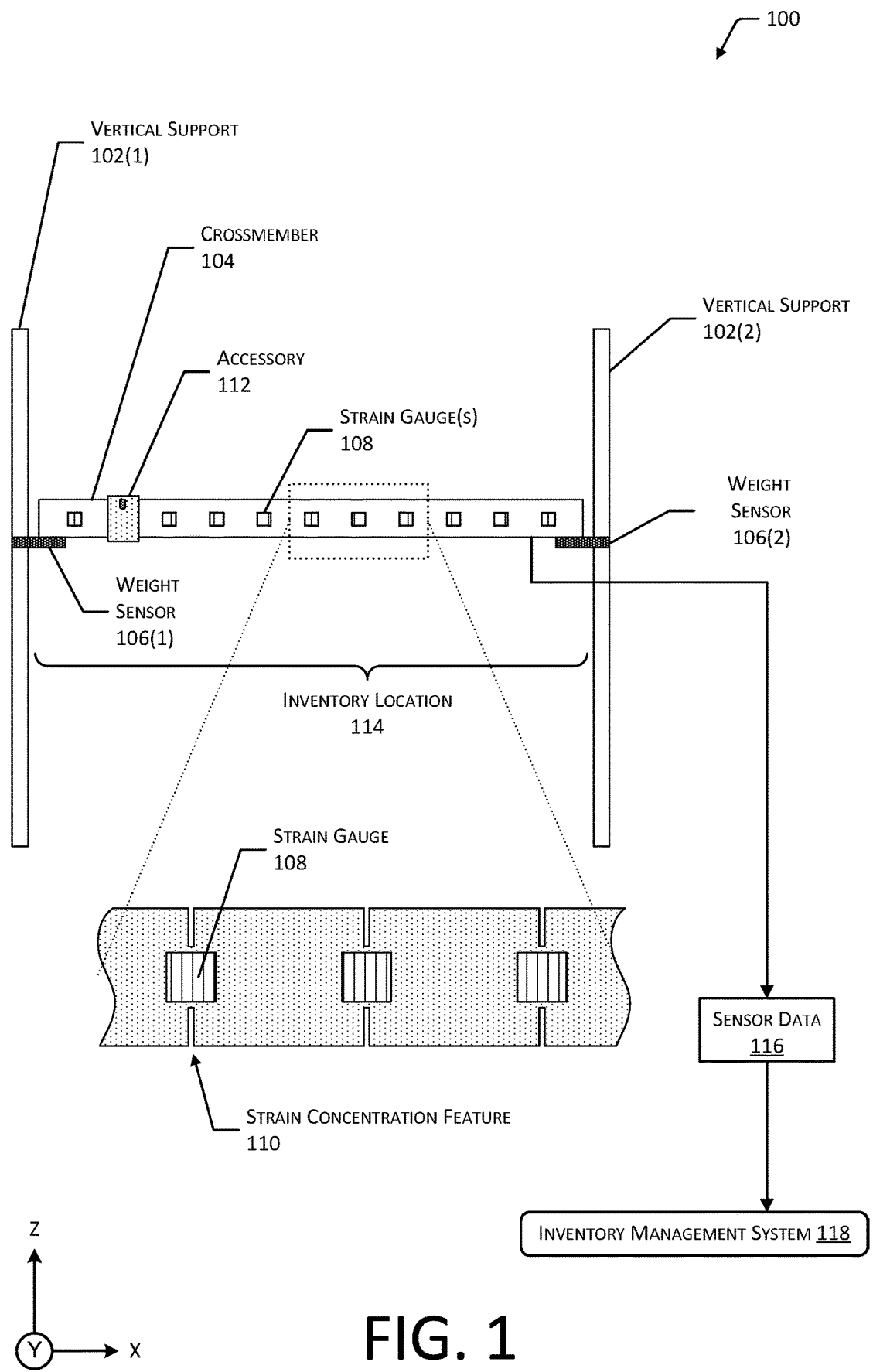
FIG. 1 illustrates a system with an inventory location with a crossmember that is attached to a pair of weight sensors and includes strain gauges that provide sensor data which may then be used to determine interaction data about the pick (removal) or place (return or loading) of items to the inventory location, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A material handling facility (facility) or other setting may utilize fixtures that provide inventory locations used to stow or otherwise hold items. For example, the fixtures may include a crossmember that is used to support accessories such as shelves, hooks, bins, baskets, and so forth that are then used to store items. In some implementations, each accessory may be used to store a single type of item. The fixtures may include sensors that produce sensor data, such as weight sensors that measure the weight supported by the crossmember and strain gauges on the crossmember that measure strain on the crossmember.

The facility may include, or have access to, an inventory management system. The inventory management system may be configured to maintain information about items, users, condition of the facility, and so forth based at least in part on the sensor data. The inventory management system may use the sensor data to determine interaction data. The interaction data may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the inventory management system may generate interaction data that indicates what item the user picked from a particular lane on a shelf, and then use this interaction data to adjust the count of inventory stowed at that lane. The interaction data may then be used to bill an account associated with the user for the item that was picked, or credit the account for the item that was placed.

Traditional systems may use weight sensors with fixed platforms to obtain information about the weights of objects on those platforms. Individual weight sensors are expensive and may require labor intensive actions during assembly. Additionally, these systems may either be unable to be reconfigured or may be time consuming to reconfigure, requiring the removal of fasteners and so forth to change from one kind of platform to another.

Described in this disclosure are devices that allow for the determination of a weight change at an inventory location and also provides information about one or more of where the weight change took place or weight change data specific to where the weight change took place. The inventory locations may comprise one or more crossmembers. One or more accessories that are used to stow items are supported by a crossmember during use. The accessory may include a hook, shelf, bin, basket, dispenser, and so forth that stows an item. Different types of accessories may be supported by a single crossmember. For example, a single crossmember may support three accessories with hooks from which bagged items may be suspended, seven accessories with shelves upon which boxed items may sit, and seven accessories with bins to contain loose items. As the needs of the facility change, the accessories may be easily added, removed, moved, or otherwise adjusted.

The crossmember is attached to one or more weight sensors, such as that the weight of a load on the crossmember may be measured by the one or more weight sensors. For example, a first weight sensor may support a first end of the crossmember while a second weight sensor supports the second end of the crossmember. Accessories may then be attached to the crossmember and then used to stow items. At a first time a first total weight is determined. Continuing the example with two weight sensors, the first total weight may be a sum of the weights measured by the first weight sensor and the second weight sensor. At a second time a second total weight is determined. A total weight change may then be determined by subtracting the first total weight from the second total weight.

A plurality of strain gauges are affixed to the crossmember and produce data indicative of strain values. A particular strain gauge is associated with a particular position on the crossmember at which the strain gauge is affixed. For example, eleven strain gauges may be evenly spaced left to right along the crossmember. The load on the crossmember may change due to picks, places, and so forth. As the load changes, strain on the crossmember changes and these changes may be detected by one or more of the strain gauges and strain values are determined. For example, as an item is added to an accessory, the increased weight results in a slight deformation of the crossmember. This slight deformation is detected by the strain gauges close to the accessory, and strain values are produced. Returning to the earlier example, strain values for individual strain gauges may be determined at the first time and the second time. Strain value changes for individual strain gauges may be determined by subtracting the strain values obtained at the second time from the strain values obtained at the first time by the same strain gauge.

The strain change values provide useful information that may be used to determine where along the crossmember a change occurred. For example, assume that eleven accessories of equal width have been attached to the crossmember which has eleven strain gauges arranged evenly left to right. As an item is picked from the third accessory from the left, the strain on the crossmember changes. The change in strain may be most pronounced closest to the accessory, while the strain dissipates as the distance along the crossmember from the third accessory increases.

In one implementation, the strain change values may be used to determine the position along the crossmember at which an event took place, such as a pick or a place. For example, the strain change value for the second strain gauge from the left may indicate a maximum relative to the strain change values from other strain gauges. Output data may be generated that indicates that a change in weight occurred at the position associated with the second strain gauge. The output data may also include the total weight change measured by the weight sensors. As a result, the output data indicates the total weight change and the position of the weight change. Data that indicates what type of item is designated as being stowed at that position may then be used to determine interaction data that describes the type of item, a quantity, and whether the interaction was a pick or place.

In another implementation the strain change values may be used to determine a weight change at a particular position along the crossmember. For example, a total strain change value may be determined by summing the strain change values. A relative value or fraction of the total strain change value may be determined for individual strain gauges. In one implementation the relative value associated with a particular strain gauge, and thus position, may be determined by dividing the strain change value of that strain gauge by the total strain change value. The weight change associated with that strain gauge may then be determined by multiplying the total weight change by the relative value for that strain gauge. In other implementations, other techniques may be used to determine the weight change associated with the position. The weight change may then be used to determine the interaction data.

In some implementations, the crossmember may include strain concentration features. The strain concentration features direct a strain upon a portion of the crossmember towards a particular area on the crossmember. For example, the strain concentration feature may comprise a slot that is cut in the crossmember. As a load is applied to the crossmember, the strain on the crossmember becomes concentrated at the remaining uncut material. Other strain concentration features may be used in other implementations.

The devices described in this disclosure provide a relatively low cost, physically robust system device that allows for information about changes in weight to be determined using the techniques described herein. This information may be used by the inventory management system to facilitate and improve operations by providing information as to the current quantity and movement of items in the facility.

Illustrative System

FIG. 1 illustrates a system 100 with an inventory location with a crossmember that is attached to a pair of weight sensors and includes strain gauges that provide sensor data which may then be used to determine interaction data about the pick (removal) or place (return or loading) of items to the inventory location, according to some implementations.

In this implementation, a pair of vertical supports 102(1) and 102(2) are shown. The vertical supports 102 may be mounted to a base, affixed to a wall, suspended from a ceiling, and so forth. For example, the vertical supports 102 may be part of a rack.

A crossmember 104 has a first end and a second end, with the first end proximate to the first vertical support 102(1) and a second end proximate to the second vertical support 102(2). The first end of the crossmember 104 is supported by a first weight sensor 106(1) and a second end of the crossmember 104 is supported by a second weight sensor 106(2). The weight sensors 106 may be affixed to a bracket or other member (not shown) that engages or is otherwise supported by the vertical support 102. For example, the first weight sensor 106(1) may be attached to the first vertical support 102(1) while the second weight sensor 106(2) is attached to the second vertical support 102(2).

The weight sensors 106 are configured to generate information indicative of weight applied thereto. The weight sensor 106 may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of a weight sensor 106 may operate as transducers that generate one or more signals based on an applied force, such as that of the load due to gravity. For example, the weight sensor 106 may comprise a load cell that includes one or more strain gauges 108 and a specifically engineered structural member that deforms in a controlled fashion when weight is applied. The strain gauge 108 used in a weight sensor 106 may be temperature compensated, exhibit a greater sensitivity, and so forth. The weight sensor 106 may include other mechanical components or features to prevent bottoming out. By measuring a change in the electrical characteristic of the strain gauge 108, such as capacitance or resistance, the weight may be determined. In another example, the weight sensor 106 may comprise a force sensing resistor (FSR). The FSR may comprise a resilient material that changes one or more electrical characteristics when compressed. For example, the electrical resistance of a particular portion of the FSR may decrease as the particular portion is compressed.

The strain gauges 108 comprise transducers that provide a signal indicative of a change in shape to at least a portion of the transducer. An individual strain gauge 108 may comprise a flexible carrier to which one or more elements, such as electrically conductive traces, optical fibers, and so forth, are affixed. The flexible carrier may comprise a plastic, metal, paper, or other material.

The strain gauge 108 is affixed to the crossmember 104. For example, the strain gauge 108 may be affixed to the crossmember 104 using one or more of an adhesive, lamination, mechanical fasteners, and so forth. Once affixed, as the crossmember 104 deforms under the influence of an external force, such as a load, one or more of the strain gauges 108 may detect this strain.

As described above, in some implementations the weight sensors 106 may comprise a load cell with an integrated strain gauge 108. The strain gauge 108 used in the weight sensor 106 may be of a first type that differs from a second type of strain gauge 108 that is used on the crossmember 104. For example, the load cell may use a temperature compensated strain gauge 108, such as incorporating wires of a constantan alloy, while the strain gauges 108 used on the crossmember 104 may instead use an isoelastic alloy.

In some implementations the crossmember 104 may include one or more strain concentration features 110. The strain concentration features 110 direct a strain upon a portion of the crossmember 104 towards a particular area on the crossmember 104. The strain concentration features 110 may include one or more of a hole, a slot, a notch, a groove, a rib, a gusset, a boss, a transition from a first thickness to a second thickness, a cut, a ridge, a plate, and so forth. For example, the strain concentration feature 110 may comprise a slot that is cut in the crossmember 104. As a load is applied to the crossmember 104, the strain on the crossmember 104 becomes concentrated at the remaining uncut material. For example, as depicted here the strain gauges 108 are positioned between perpendicular slots that extend towards the center of the crossmember 104. Other strain concentration features 110 may be used in other implementations.

One or more accessories 112 may be attached to or otherwise supported by the crossmember 104. The accessory 112 may comprise a hook, a shelf, a bin, a basket, or other structure that may be used to stow items. The accessory 112 may also include one or more engagement features that mechanically engage a portion of the crossmember 104.

An inventory location 114 may comprise the vertical supports 102, one or more crossmembers 104, weight sensors 106, accessories 112, and so forth. For example, a plurality of crossmembers 104 may be supported by a plurality of weight sensors 106 that are supported by the vertical supports 102.

During operation, electronics (not shown) are used to generate sensor data 116 based on output from one or more of the weight sensors 106 and the strain gauges 108. In one implementation the weight sensors 106 and the strain gauges 108 may produce analog signals that are subsequently converted into digital data and processed to produce the sensor data 116. The electronics may be retained within or affixed to the crossmember 104. In another example, the electronics may be retained within or affixed to the vertical supports 102 or another structure and may be connected to the weight sensors 106 and the strain gauges 108 on the crossmember 104.

The sensor data 116 may be sent to an inventory management system 118. The inventory management system 118 may be configured, as described below, to perform various functions with regard to a facility, including but not limited to tracking movement of items, determining quantity on hand of items, and so forth.

Figure 2A:
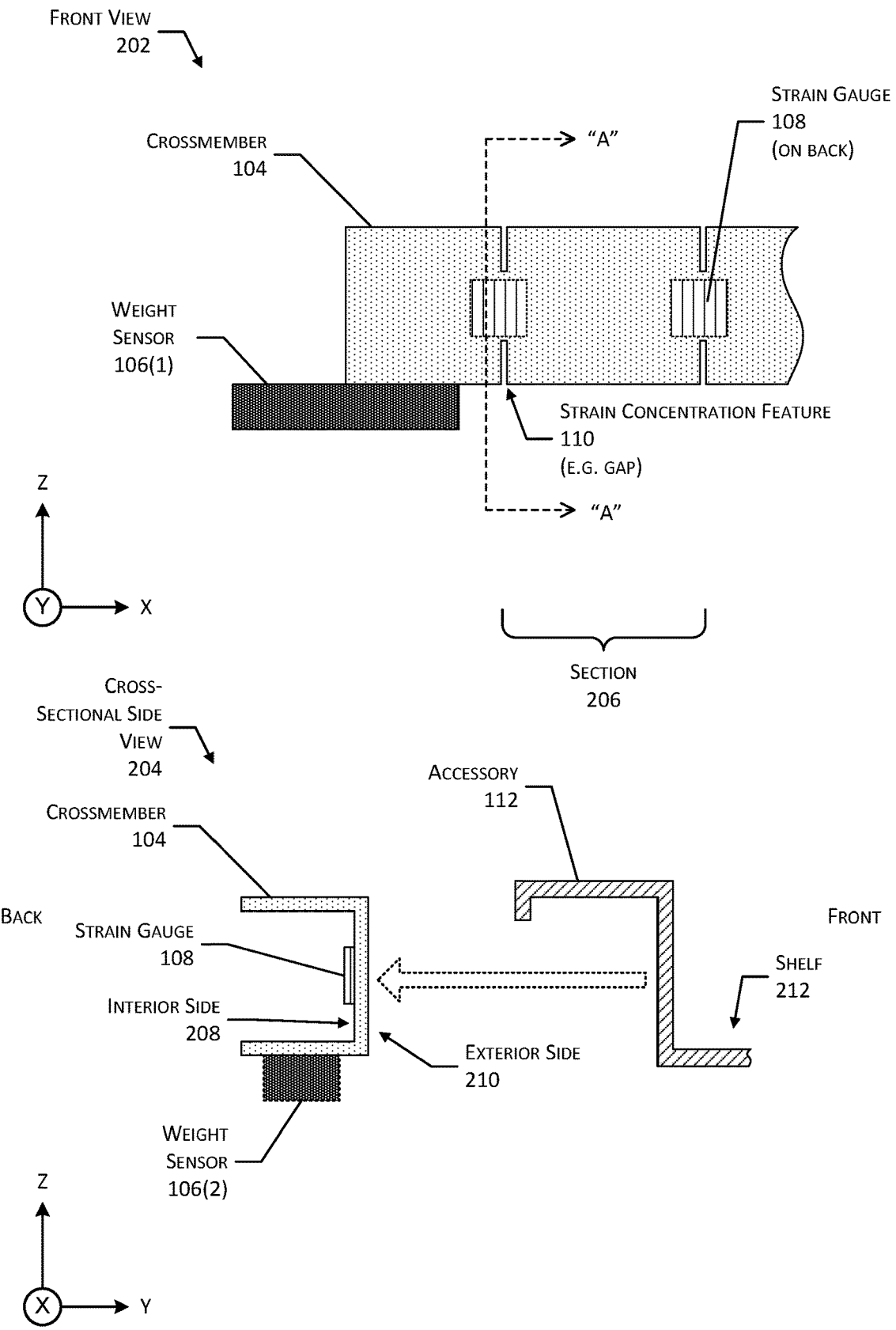
FIG. 2A illustrates a front view and a cross-sectional side view of a portion of the crossmember, according to some implementations.

FIG. 2A illustrates views of a portion of the crossmember 104, according to some implementations. A front view 202 and a cross-sectional side view 204 of a portion of the crossmember 104 are shown here, according to some implementations. In this implementation, the weight sensor 106 is shown underneath the crossmember 104. In other implementations the weight sensor 106 may be in other locations with respect to the crossmember 104, such as above the crossmember 104, at the end of the crossmember 104, and so forth.

In the front view 202, a plurality of strain concentration features 110 comprising cuts or gaps in the crossmember 104 are shown. The strain concentration features 110 may be used to divide the crossmember 104 into sections 206. For example, a section 206 may extend from one strain concentration feature 110 to another. In another implementation the sections 206 may be delineated by the location of a strain gauge 108. For example, the section 206 may extend from the center of one strain gauge 108 to another.

In the implementation shown here, the strain gauges 108 are shown placed between opposing gaps or cuts in the crossmember 104. In other implementations the strain gauges 108 may be placed in other locations with respect to the crossmember 104.

The cross-sectional side view 204 shows a cross section along line A-A. In this implementation, the crossmember 104 comprises three sides arranged to provide a U-shaped cross section. In other implementations, other cross-sectional shapes may be used. The crossmember 104 has an interior side 208 and an exterior side 210. The exterior side 210 may be proximate to a front of the crossmember 104 during use.

The strain gauges 108 may be affixed to the interior side 208 of the crossmember 104. This placement may protect the strain gauges 108 from damage. The strain gauges 108 may be placed at areas on the crossmember 104 that exhibit deformation due to changes in strain. For example, the strain gauges 108 may be placed where two sections are adjacent to one another.

In some implementations the strain gauges 108 may be individually affixed to the crossmember 104. In another implementation, the plurality of strain gauges 108 are affixed to a carrier substrate that is then affixed to the crossmember 104 using an adhesive. For example, the plurality of strain gauges 108 may be affixed to a plastic carrier that also includes a flexible printed circuit, such as electrically conductive traces.

Also shown in the cross-sectional side view 204 is one implementation of an accessory 112 that is designed to be attached to the crossmember 104. The accessory 112 includes one or more engagement features, such as a lip that is used to retain the accessory 112 on the crossmember 104. In this illustration, the accessory 112 comprises a shelf 212 that extends towards the front of the inventory location 114. Items may then be stowed on the shelf 212.

Depending upon the type of strain concentration feature 110, the location of the strain gauge 108, and so forth, the strain gauge 108 may measure torque, shear, or other movements of the crossmember 104.

Figure 2B:
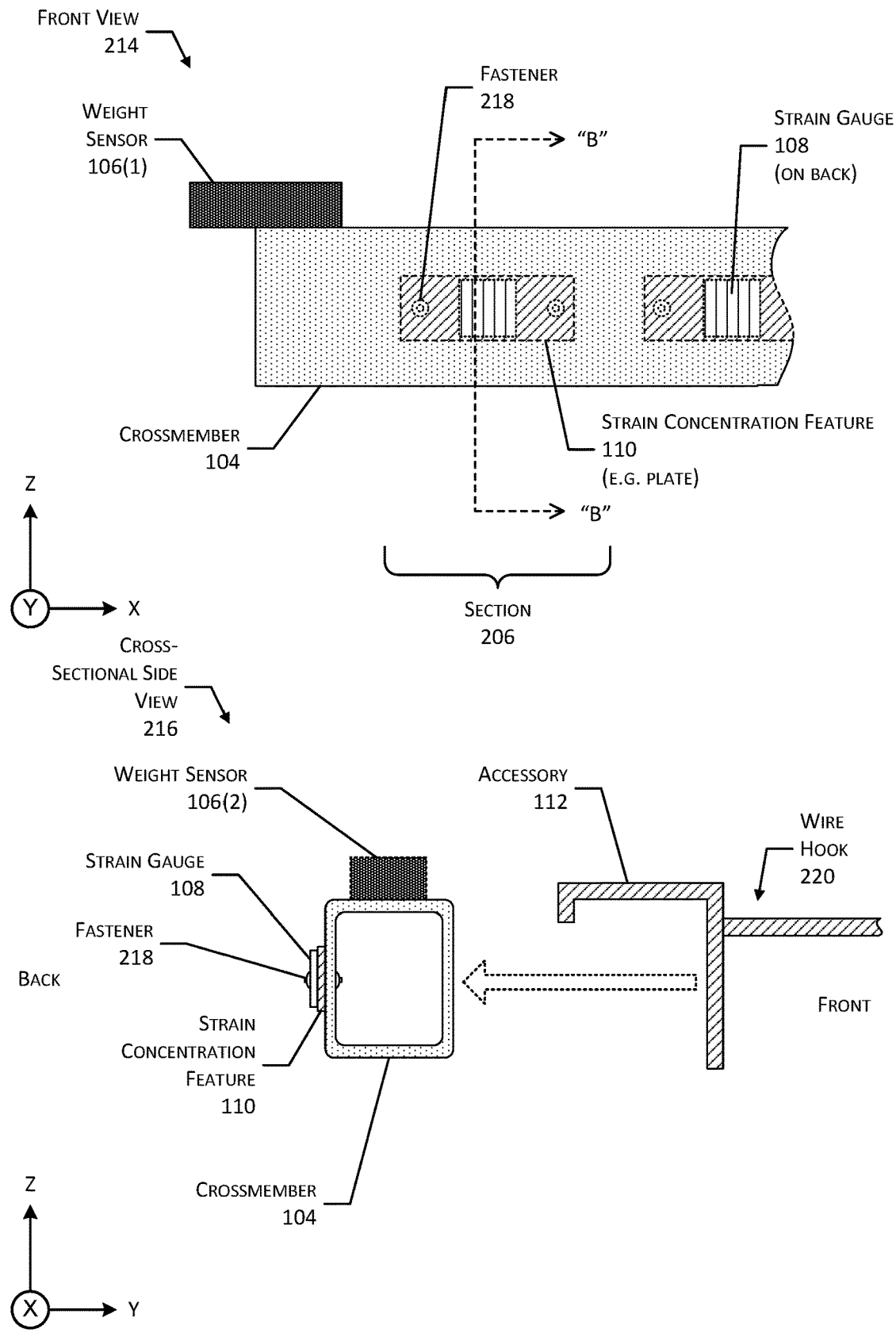
FIG. 2B illustrates a front view and a cross-sectional side view of a portion of the crossmember, according to another implementation.

FIG. 2B illustrates views of a portion of the crossmember 104, according to another implementation. A front view 214 and a cross-sectional side view 216 of a portion of another implementation of the crossmember 104 is shown here. In this implementation, the weight sensor 106 is shown above the crossmember 104.

In the front view 202, a plurality of strain concentration features 110 are shown. Each strain concentration feature 110 comprises a plate that is in turn mechanically affixed to the crossmember 104. The plate has a first end and a second end. Each end is mechanically affixed to a different portion of the crossmember 104. For example, a fastener 218 such as a bolt, screw, or rivet may be used to affix the ends of the plate to the crossmember 104. While the plate is shown with a square perimeter, in other implementations other shapes may be used. In other implementations other methods such as welding, adhesives, and so forth may be used to affix the ends of the plate to the crossmember 104. One or more strain gauges 108 are affixed to the strain concentration feature 110. Relative to deformation in the crossmember 104 that results from a change in loading on the crossmember 104, the deformation in the plate is exaggerated. For example, the plate is less rigid than the crossmember 104. As a result, under a change in load the plate may experience greater deformation at the location of the strain gauge 108 than a similar strain gauge 108 that is directly affixed to the surface of the crossmember 104. As a result of the greater deformation, the signal produced by the strain gauge 108 exhibits a greater signal to noise ratio (SNR), improving the quality of the output data.

As described above, the strain concentration features 110 may be used to divide the crossmember 104 into sections 206. For example, a section 206 may span the plate of the strain concentration feature 110.

The cross-sectional side view 216 shows a cross section along line B-B. In this implementation, the crossmember 104 comprises a square tube. In other implementations, other cross-sectional shapes may be used. For example, the crossmember 104 may comprise a square bar. The crossmember 104 has a back side and a front side. The front side is proximate to the accessory 112 during use.

Also shown in the cross-sectional side view 216 is one implementation of an accessory 112 that is designed to be attached to the crossmember 104. The accessory 112 includes one or more engagement features, such as a lip that is used to retain the accessory 112 on the crossmember 104. In this illustration, the accessory 112 comprises a wire hook 220 that extends towards the front of the inventory location 114. Items may then be hung from the wire hook 220.

Figure 2C:
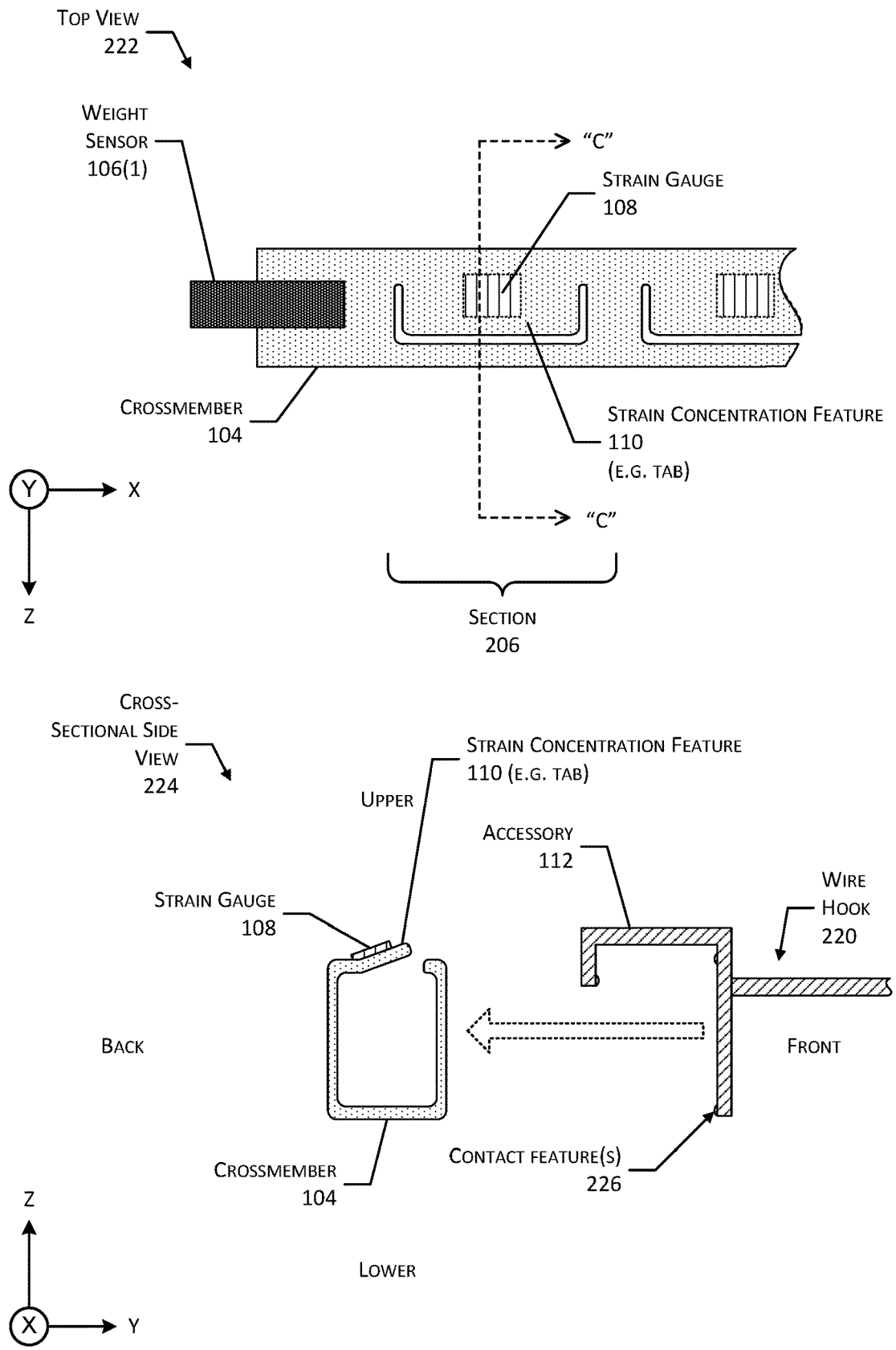
FIG. 2C illustrates a top view and a cross-sectional side view of a portion of the crossmember, according to another implementation.

FIG. 2C illustrates views of a portion of the crossmember 104, according to another implementation. A top view 222 and a cross-sectional side view 224 of a portion of another implementation of the crossmember 104 is shown here. In this implementation, the weight sensor 106 is shown above the crossmember 104.

In the top view 222, a plurality of strain concentration features 110 are shown. Each strain concentration feature 110 in this illustration comprises a tab or portion of the crossmember 104 that extends from the crossmember 104. For example, as shown the tab may be formed by removing material around the perimeter of the tab, separating it on three sides from the crossmember 104. The tab may then be bent or formed so that a top of the tab extends above an upper side of the crossmember 104. While a rectangular tab is shown, in other implementations other shapes may be used. In other implementations other methods such as welding, adhesives, and so forth may be used to affix the tab to the crossmember 104. For example, the tab may be riveted to the crossmember 104.

One or more strain gauges 108 are affixed to the strain concentration feature 110. Relative to deformation in the crossmember 104 that results from a change in loading on the crossmember 104, the deformation in the tab is exaggerated. For example, as the weight of the accessory 112 presses down on the tab, the tab experiences some deflection which may be detected by the strain gauge 108. As a result of the greater deformation, the signal produced by the strain gauge 108 exhibits a greater signal to noise ratio (SNR), improving the quality of the output data.

As described above, the strain concentration features 110 may be used to divide the crossmember 104 into sections 206. For example, a section 206 may span the tab of the strain concentration feature 110.

The cross-sectional side view 224 shows a cross section along line C-C. In this implementation, the crossmember 104 comprises a square tube. In other implementations, other cross-sectional shapes may be used. For example, the crossmember 104 may comprise a square bar. The crossmember 104 has a back side, a front side, an upper side, and a lower side. The front side is proximate to the accessory 112 during use.

Also shown in the cross-sectional side view 224 is one implementation of an accessory 112 that is designed to be attached to the crossmember 104. The accessory 112 includes one or more engagement features, such as a lip that is used to retain the accessory 112 on the crossmember 104. The accessory 112 may comprise a low-friction material or may include one or more contact features 226 that facilitate movement between the accessory 112 and the crossmember 104. For example, the contact features 226 may comprise polytetrafluoroethylene features affixed to the inner surface of the accessory 112 at points that will come into contact with the crossmember 104 during use.

In this illustration, the accessory 112 comprises a wire hook 220 that extends towards the front of the inventory location 114. Items may then be hung from the wire hook 220. As the weight on the accessory 112 changes, so too does the force on the strain concentration feature 110, resulting in data from the strain gauge 108 that is indicative of the weight on the accessory 112.

In other implementations other configurations may be used. For example, an arm may be affixed to, or integral with the crossmember 104. The arm may extend towards the front, away from the crossmember 104. An accessory 112 may then be supported by the arm. A strain gauge 108 may be affixed to an underside of the arm, proximate to the crossmember 104. As a load on the arm changes, the resulting deformation may be detected by the strain gauge 108 and used to determine a change in weight on the accessory 112.

Figure 3:
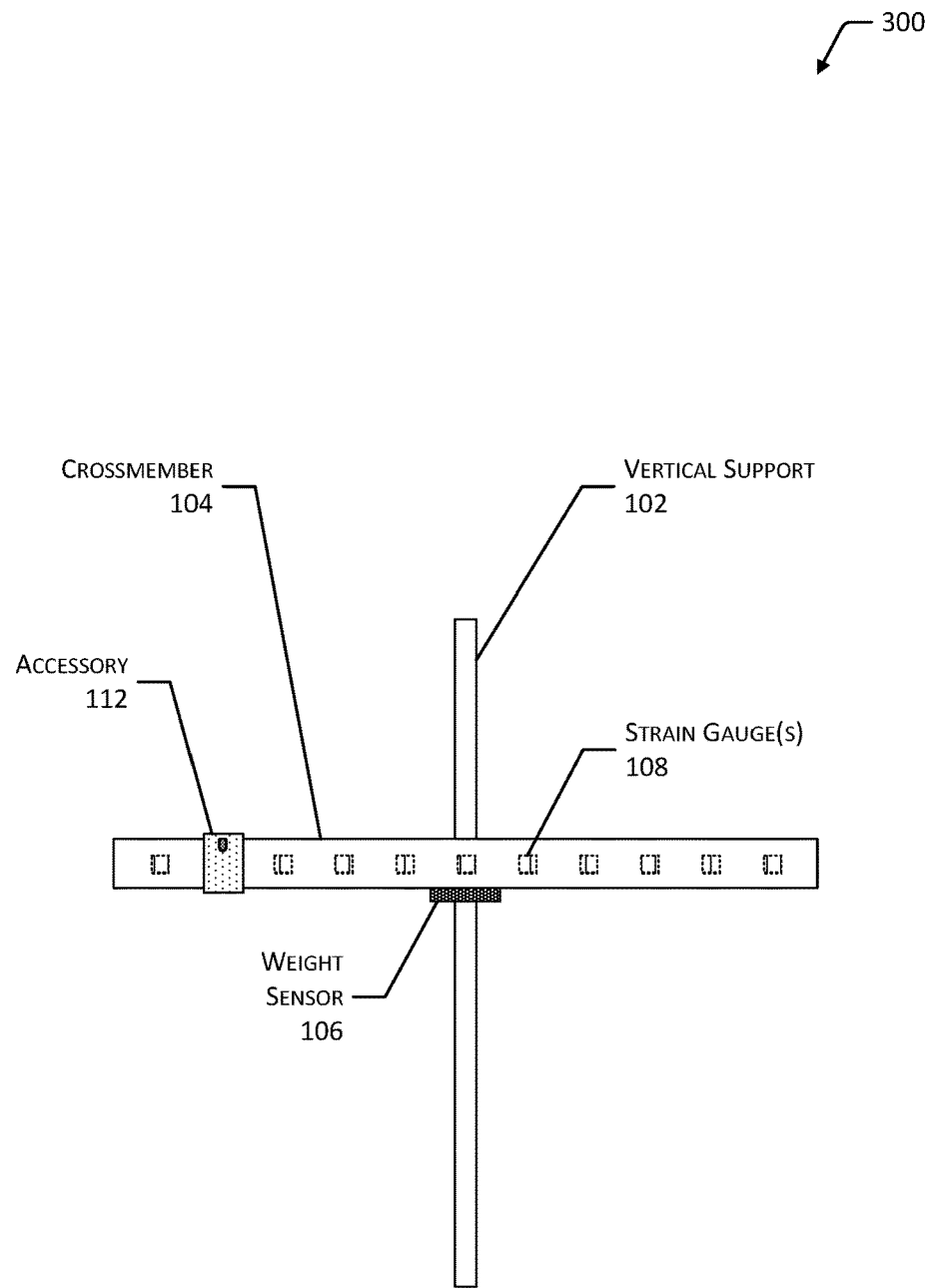
FIG. 3 illustrates an implementation in which the crossmember is attached to a single weight sensor.

FIG. 3 illustrates a front view 300 of an implementation in which the crossmember 104 is attached to a single weight sensor 106. The crossmember 104 may have a single weight sensor 106 attached to a midpoint between the first end and the second end. The single weight sensor 106 is thus able to provide information about the weight of the crossmember 104, any accessories 112 that are attached to the crossmember 104, and any items stowed by the accessories 112.

In other implementations, other configurations of one or more weight sensors 106 may be used.

Figure 4:
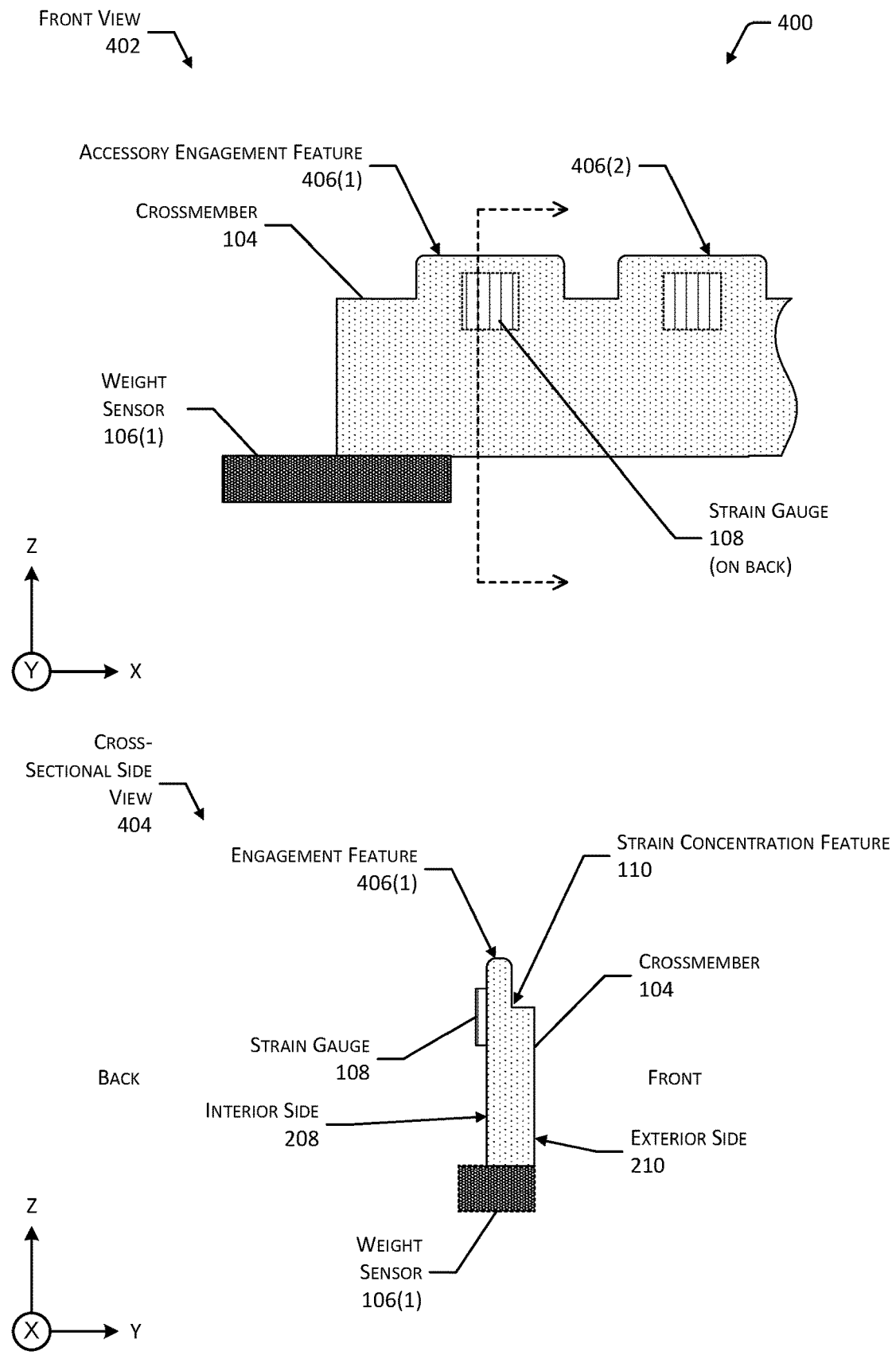
FIG. 4 illustrates a front view and a cross-sectional side view of another implementation of the crossmember that includes engagement features for accessories.

FIG. 4 illustrates 400 a front view 402 and a cross-sectional side view 404 of another implementation of the crossmember 104. In this implementation, the crossmember 104 includes accessory engagement features 406 that facilitate mechanical engagement or retention of one or more accessories 112. These accessory engagement features 406 extend perpendicularly with respect to a long axis of the crossmember 104. In this implementation, the strain gauges 108 are located on the back of the crossmember 104, proximate to where the accessory engagement features 406 joins to or transitions into the body of the crossmember 104.

As shown in the cross-sectional side view 404, the crossmember 104 may be generally rectangular in cross-section, with the engagement feature 406 extending perpendicularly away from the body of the crossmember 104. In some implementations the accessory engagement feature 406 may have a different thickness than the body of the crossmember 104. The strain concentration feature 110 may be formed by this transition.

Figure 5:
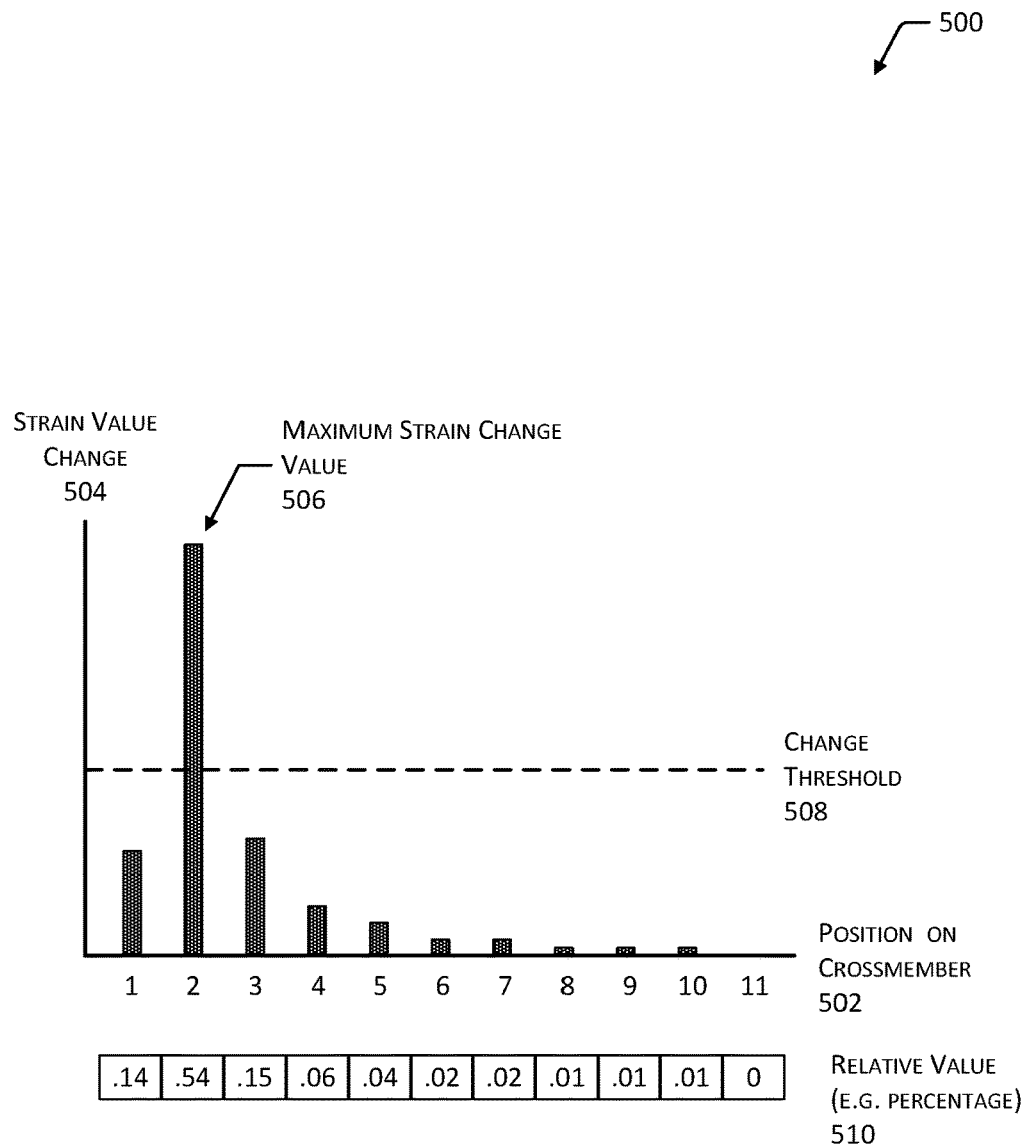
FIG. 5 illustrates a graph of strain value changes indicative of change in strain from a first time to a second time, as measured by the strain gauges on the crossmember.

FIG. 5 illustrates a graph 500 of strain value changes indicative of change in strain from a first time to a second time, as measured by the strain gauges 108 on the crossmember 104. In one implementation, a strain value change may be determined as a difference between strain values measured by a particular strain gauge 108 at a first time and a second time. The strain values and the strain change values may be dimensionless.

As shown in the graph 500, a horizontal axis depicts a position on the crossmember 502. The position may be indicative of an index number, may correspond to a particular location of a particular strain gauge 108 such as an indication of number of centimeters from an origin, and so forth. A vertical axis indicates a strain value change 504.

The graph 500 continues the example illustrated in FIG. 1, in which an accessory 112 is positioned on the crossmember 104 proximate to the second strain gauge 108(2) as counted left to right. For this example, an item has been stowed to the accessory 112, such as from placing an item on the shelf 212. The increase in weight on the shelf 212 from the weight of the item is transferred by the accessory 112 to the crossmember 104. This increase in weight introduces a change in the strain on the crossmember 104 from a first time before the item was placed to a second time after the item was placed. The resulting strain value changes 504 are depicted here. A maximum strain change value 506 of strain value change is depicted here at the position on the crossmember 502 that corresponds to the second strain gauge 108(2). The adjacent strain gauges 108(1) and 108(3) also show some strain value changes 504. The strain value changes 504 decrease as the distance from the accessory 112 increases.

In some implementations the strain value changes 504 may be compared to a change threshold 508. If a strain value change 504 exceeds the change threshold 508, information indicative of a change at the position of the associated strain gauge 108 may be generated. For example, as the maximum strain change value 506 associated with the second strain gauge 108(2) exceeds the change threshold 508, output data may be generated that indicates a change at the second position on the crossmember 502.

In other implementations the strain value changes 504 may be analyzed to determine a global maximum or local maxima. For example, a strain value change 504 that exhibits a greatest absolute value may be designated as a global maximum. The output data may indicate a change at the position associated with the global maximum. In another example, the strain value change 504 for a given position that exhibits a value greater than that of a position immediately adjacent to the left and a position immediately adjacent to the right on the crossmember 104 may be designated as a local maximum. The output data may then indicate a change at the position associated with the local maximum. In other implementations, other techniques may be used.

In some implementations, the mathematical sign of the strain value change 504 may be used to determine if an interaction with the inventory location 114 is a pick (removal of an item) or a place (adding an item). For example, a positive strain value change 504 may be associated with a place while a negative strain value change 504 may be associated with a pick.

Also shown is a relative value 510 that is indicative of a fraction or percentage of the total strain change value that is associated with individual strain gauges 108. A total strain change value may be determined by summing all of the strain value changes 504 for a crossmember 104. The relative value 510 may be determined by dividing the strain value change 504 for a given strain gauge 108, or set of strain gauges 108, by the total strain change value. For example, 0.14 of the total strain change value is associated with position 1, 0.54 with position 2, 0.15 with position 3, and so forth.

The relative value 510 may be used to determine a weight change associated with a particular position on the crossmember 502. In one implementation, a total weight change may be multiplied by the relative value 510 to determine a weight change associated with a particular position on the crossmember 502 and the accessory 112 attached thereto. Continuing the example, if the total weight change measured by the weight sensors 106 is +230 grams then the weight change associated with the second position on the crossmember 502 may be +230*0.54=124 grams. In another implementation, the weight change associated with a particular position on the crossmember 502 may be determined based on the position associated with the maximum strain change value 506 and using a sum of the relative values for the position with the maximum and adjacent positions. For example, the weight change associated with the second position on the crossmember 502 may be +230*(0.14+0.54+0.15)=190 grams. In other implementations, such as those described below with regard to FIG. 6 other techniques may be used.

While the strain values and strain change values are discussed with respect to individual strain gauges 108, it is understood that in some implementations the strain values and strain change values for a plurality of individual strain gauges that are associated with a particular position may be used. For example, a pair of directional strain gauges 108 may be affixed to a position on the crossmember 104, each sensitive to strain in a different direction. The outputs from this pair of strain gauges 108 may be used as described herein.

In some implementations the inventory management system 118 may use this data to generate or assess possible hypotheses as to an interaction at the inventory location 114. The inventory management system 118 may maintain data that indicates what types of items are stowed at particular positions on a particular crossmember 104. This information may be used to determine possible interactions that may occur. For example, if the output data indicates a change at the second position, hypotheses that involve other types of items stowed by accessories 112 in other positions on the same crossmember 104 may be disregarded from consideration. The remaining hypotheses describing possible interactions associated with the type of item designated as being stowed by the accessory 112 at the second position on the crossmember 502 may then be assessed using other data, such as weight data obtained from the weight sensors 106, image data obtained from one or more cameras, and so forth.

Figure 6:
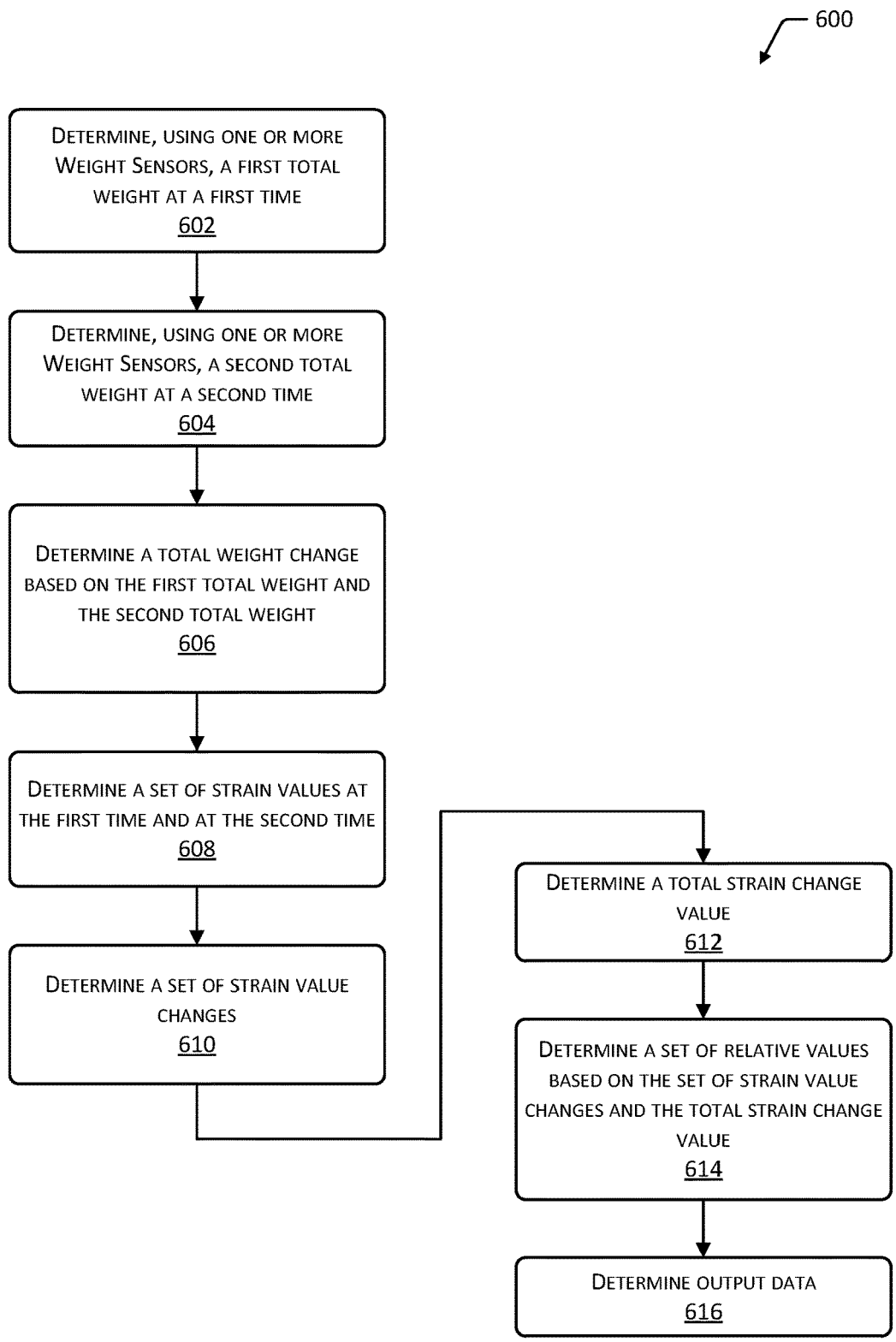
FIG. 6 illustrates a flow diagram of a process that uses data from weight sensors and strain value changes to determine output data such as a weight change at a particular location on the crossmember, according to some implementations.

FIG. 6 illustrates a flow diagram 600 of a process that uses data from weight sensors 106 and strain value changes 504 from the strain gauges 108 to determine output data, such as a weight change at a particular position on the crossmember 502, according to some implementations. The process may be implemented at least in part by electronics associated with the inventory location 114, by another device, by the inventory management system 118 executing on one or more computing devices, and so forth.

At 602 a first total weight at a first time is determined using output from one or more weight sensors 106. For example, the first total weight may be determined by summing the output from the one or more weight sensors 106 at the first time.

At 604 a second total weight at a second time is determined using output from the one or more weight sensors 106. For example, the second total weight may be determined by summing the output from the one or more weight sensors 106 at the second time.

At 606 a total weight change is determined based on the first total weight and the second total weight. For example, the total weight change may be determined by subtracting the first total weight from the second total weight.

At 608 strain values at the first time and the second time are determined. For example, based on output from the plurality of strain gauges 108 at the first time, a first set of strain values indicative of first strain values for individual ones of the strain gauges 108 are determined. Continuing the example, based on output from the plurality of strain gauges 108 at the second time, a second set of strain values indicative of second strain values for individual ones of the strain gauges 108 are determined.

At 610 a set of strain value changes is determined. For example, an individual strain value change 504 may be determined by subtracting a first strain value from a second strain value for individual ones of the strain gauges 108.

At 612 a total strain change value is determined. For example, the total strain change value may be determined by summing the set of strain value changes 504.

At 614 a set of relative values is determined based on the set of strain value changes 504 and the total strain change value. For example, the strain value changes 504 for individual ones of the strain gauges 108 may be divided by the total strain change value to determine a relative value 510 associated with that strain gauge 108.

In another implementation, the determination of the total strain change value may be omitted and preset relative values may be retrieved. For example, preset relative values may be associated with particular total weight changes, particular strain gauge 108, and so forth.

At 616 output data is determined. The output data may be determined based on one or more of the total weight change, the strain value changes 504, the total strain change value, and so forth. For example, based on the relative values 510, the output data may be indicative of a weight change occurring at a particular position on the crossmember 502. In another example, a weight change associated with the particular position on the crossmember 502 may be calculated by multiplying the relative value 510 for that position by the total weight change.

One implementation of the process 600 to determine a weight change associated with a particular strain gauge 108 as a function for execution by one or more hardware processors of a computing device is depicted below.

---

ILLUSTRATIVE CODE IMPLEMENTATION

```
% This function takes in a data set containing weight sensor values in the first
% 2 cols and strain gauge values in the rest of the cols. Each row
% is a unit of time. It returns the weight change per lane as a struct.
function [laneWeightChanges] = getLaneWeightChanges(datafile)
dataSet = importdata(datafile);             % Import the data file
if isstruct(dataSet)            % Remove headers
    dataSet = [dataSet.data];
end
[lenDataSet, numLanes] = size (dataSet);            % Total number of sensors/lanes and length of data set
numLanes = numLanes - 2;        % Remove LCs from numLanes
% ------ Create struct to store per lane weight change over time.
laneWeightChanges = struct('totalLaneEvents', 0, 'totalWeightChange', 0, 'weightByLane', 0);
% ------ Begin processing the data file
for T = 1:+1:lenDataSet         % Evaluate the shelf data over time
    ttlLaneEvents = 0;          % Initialize variable to track the total number of changes per unit time
    ttlRelWChange = 0;  % Initialize variable to track the total relative weight change per unit time
    laneChanges = zeros(4, 12);         % Preallocate array to hold lane change output
    for L = 3:+1:numLanes+2         % Evaluate changes in each bin. Start at column 3 as columns 1 and 2 contain LC values
```

ILLUSTRATIVE CODE IMPLEMENTATION

```
        currentLaneChange = dataSet(T,L);
        if currentLaneChange ~= 0          % If something in this lane changed
            ttlLaneEvents = ttlLaneEvents +1;              % Increment the number
of changes
            laneChanges(1,ttlLaneEvents) = L-2; % Store the lane number
in the change array
            laneChanges(2,ttlLaneEvents) = currentLaneChange;         %
Store the amount of change in the change array
        end
        ttlWChange = sumfdataSet(T,1:2));          % Sum the LC values to get
total real weight change
        ttlRelWChange = sum(laneChanges (2,:)) ;       % Get the total of
relative weight changes from each lane
        laneChanges(3,:) = laneChanges (2,:) / ttlRelWChange;         % Divide
each lane's relative change value by the total of relative change values
to get each lane's percentage of total change
        laneChanges(4,:) = ttlWChange * laneChanges(3,:);             %
Determine the weight change per bin as percentage of total real weight
change from LCs
        end
    % ------ Update the struct with event and lane change data
    laneWeightChanges(T)    =    struct('totalLaneEvents',    ttlLaneEvents,
        'totalWeightChange',    ttlWChange,    'weightByLane',    laneChanges);
end
end
```

In another implementation, based on output from the one or more weight sensors at a first time, a first total weight is determined. Based on output from the one or more weight sensors at a second time, a second total weight is determined. A total weight change by subtracting the first total weight from the second total weight is determined. For each strain gauge in the plurality of strain gauges, a first strain value at the first time and a second strain value at the second time is determined. A strain value change as the difference between the first strain value and the second strain value is determined. A total strain change value by summing the differences determined for each of the plurality of strain gauges is determined. For each strain gauge in the plurality of strain gauges, determine a relative value of the strain gauge by dividing the difference associated with the strain gauge by the total strain change value. A weight change associated with the strain gauge is determined by multiplying the total weight change by the relative value associated with strain gauge.

Figure 7:
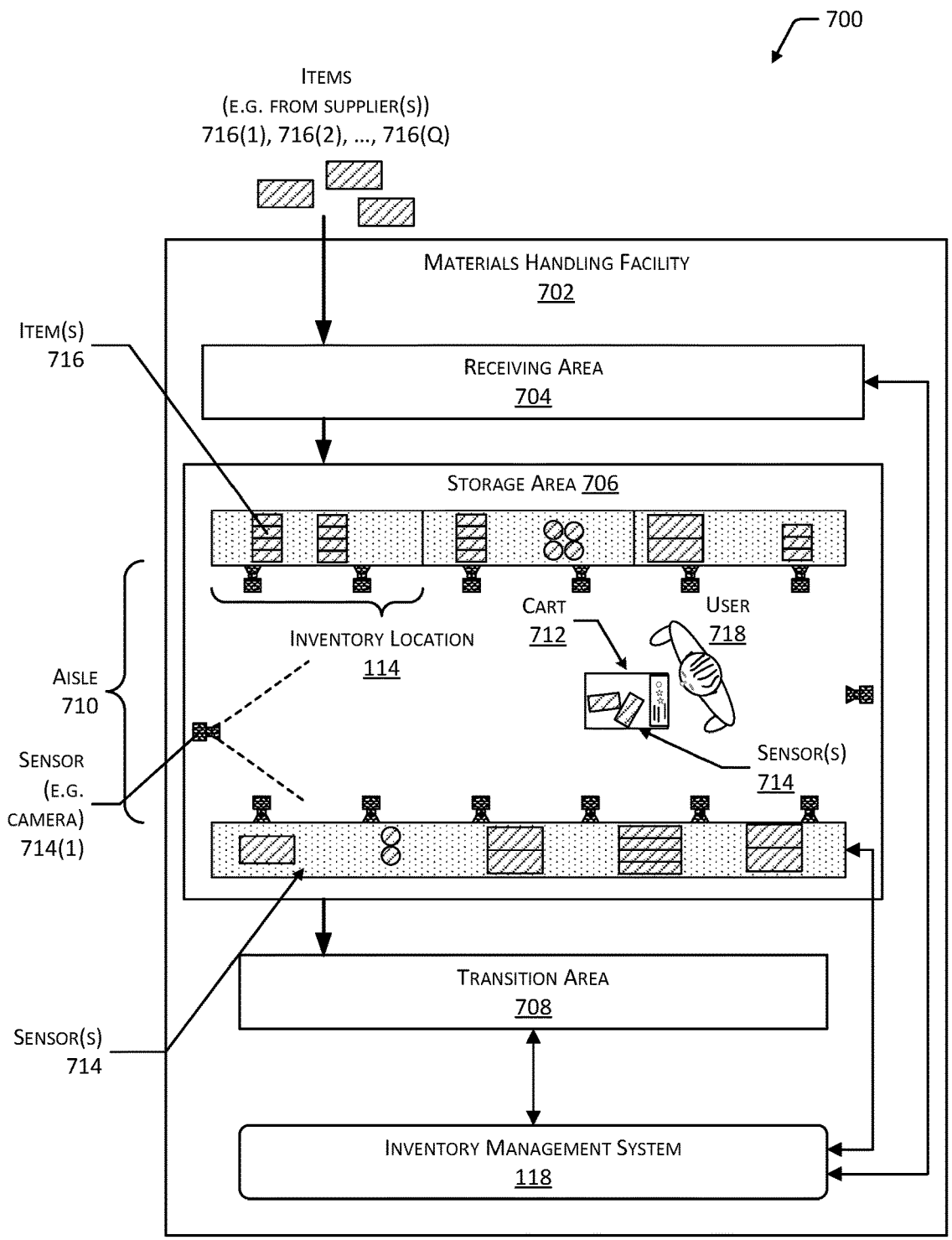
FIG. 7 is a block diagram illustrating a materials handling facility (facility) using the system, according to some implementations.

FIG. 7 is a block diagram 700 illustrating a material handling facility (facility) 702 using the system 100, according to some implementations. A facility 702 comprises one or more physical structures or areas within which one or more items 716(1), 716(2), . . . , 716(Q) may be held. The items 716 may comprise physical goods, such as books, pharmaceuticals, repair parts, electronic gear, and so forth.

The facility 702 may include one or more areas designated for different functions with regard to inventory handling. In this illustration, the facility 702 includes a receiving area 704, a storage area 706, and a transition area 708.

The receiving area 704 may be configured to accept items 716, such as from suppliers, for intake into the facility 702. For example, the receiving area 704 may include a loading dock at which trucks or other freight conveyances unload the items 716. In some implementations, the items 716 may be processed, at the receiving area 704, to generate at least a portion of item data as discussed below. For example, an item 716 may be weighed, imaged or otherwise scanned to develop reference images or representations of the item 716 at the receiving area 704.

The storage area 706 is configured to store the items 716. The storage area 706 may be arranged in various physical configurations. In one implementation, the storage area 706 may include one or more aisles 710. The aisle 710 may be configured with, or defined by, inventory locations 114 on one or both sides of the aisle 710. The inventory locations 114 may include one or more of a platform, a rack, a case, a cabinet, a bin, a floor location, or other suitable storage mechanisms for holding, supporting, or storing the items 716. For example, the inventory locations 114 may comprise one or more accessories 112 supported by a crossmember 104. The inventory locations 114 may be affixed to the floor or another portion of the structure of the facility 702. The inventory locations 114 may also be movable such that the arrangements of aisles 710 may be reconfigurable. In some implementations, the inventory locations 114 may be configured to move independently of an outside operator. For example, the inventory locations 114 may comprise a platform with a power source and a motor, operable by a computing device to allow the platform to move from one location within the facility 702 to another.

One or more users 718(1), 718(2), . . . , 718(U) and carts 712(1), 712(2), . . . , 712(T) or other material handling apparatus may move within the facility 702. For example, the user 718 may move about within the facility 702 to pick or place the items 716 in various inventory locations 114, placing them in the cart 712 for ease of transport. The cart 712 is configured to carry or otherwise transport one or more items 716. For example, the cart 712 may include a basket, bag, bin, and so forth. In other implementations, other material handling apparatuses such as robots, forklifts, cranes, aerial drones, and so forth, may move about the facility 702 picking, placing, or otherwise moving the items 716. For example, a robot may pick an item 716 from a first inventory location 114(1) and move the item 716 to a second inventory location 114(2).

While the storage area 706 is depicted as having one or more aisles 710, inventory locations 114 storing the items 716, sensors 714, and so forth, it is understood that the receiving area 704, the transition area 708, or other areas of the facility 702 may be similarly equipped. Furthermore, the arrangement of the various areas within the facility 702 is depicted functionally rather than schematically. For example, in some implementations, multiple different receiving areas 704, storage areas 706, and transition areas 708 may be interspersed rather than segregated in the facility 702.

The facility 702 may include, or be coupled to, the inventory management system 118 described above. The inventory management system 118 is configured to interact with users 718 or devices such as sensors 714, robots, material handling equipment, computing devices, and so forth, in one or more of the receiving area 704, the storage area 706, or the transition area 708.

During operation of the facility 702, the sensor data 116 based on output from the weight sensors 106, strain gauges 108, and other sensors 714 may be provided to the inventory management system 118. In addition to data obtained from the weight sensors 106 and the strain gauges 108, the sensor data 116 may include image data, non-image data, and so forth. The sensors 714 may include, but are not limited to, cameras 714(1), and so forth. The sensors 714 may be stationary or mobile, relative to the facility 702. For example, the facility 702 may include cameras 714(1) to obtain images of the user 718 or other objects in the facility 702. In another example, the inventory locations 114 may contain cameras 714(1) to acquire images of picking or placement of items 716 on shelves, and so forth. The sensors 714 are described in more detail below with regard to FIG. 8.

The inventory management system 118 or other systems may use the sensor data 116 to track the location of objects within the facility 702, movement of the objects, or provide other functionality. Objects may include, but are not limited to, items 716, users 718, carts 712, and so forth. For example, a series of images acquired by the cameras 714(1) may indicate removal by the user 718 of an item 716 from a particular location at the inventory location 114 and placement of the item 716 on or at least partially within the cart 712.

The facility 702 may be configured to receive different kinds of items 716 from various suppliers and to store them until a customer orders or retrieves one or more of the items 716. A general flow of items 716 through the facility 702 is indicated by the arrows of FIG. 7. Specifically, as illustrated in this example, items 716 may be received from one or more suppliers, such as manufacturers, distributors, wholesalers, and so forth, at the receiving area 704. In various implementations, the items 716 may include merchandise, commodities, perishables, or any suitable type of item 716, depending on the nature of the enterprise that operates the facility 702.

Upon being received from a supplier at the receiving area 704, the items 716 may be prepared for storage in the storage area 706. For example, in some implementations, items 716 may be unpacked or otherwise rearranged. The inventory management system 118 may include one or more software applications executing on a computer system to provide inventory management functions. These inventory management functions may include maintaining information indicative of the type, quantity, condition, cost, location, weight, or any other suitable parameters with respect to the items 716. The items 716 may be stocked, managed, or dispensed in terms of countable units, individual units, or multiple units, such as packages, cartons, crates, pallets, or other suitable aggregations. Alternatively, some items 716, such as bulk products, commodities, and so forth, may be stored in continuous or arbitrarily divisible amounts that may not be inherently organized into countable units. Such items 716 may be managed in terms of a measurable quantity such as units of length, area, volume, weight, time, duration, or other dimensional properties characterized by units of measurement. Generally speaking, a quantity of an item 716 may refer to either a countable number of individual or aggregate units of an item 716 or a measurable amount of an item 716, as appropriate.

After arriving through the receiving area 704, items 716 may be stored within the storage area 706. In some implementations, like items 716 may be stored or displayed together in the inventory locations 114 such as in accessories 112. In this implementation, items 716 of a single type are stored in a particular inventory location 114. In other implementations, different types of items 716 may be stored in different inventory locations 114. For example, to optimize retrieval of certain items 716 having frequent turnover within a large physical facility 702, those items 716 may be stored in several different inventory locations 114 to reduce congestion during picking that might occur at a single inventory location 114.

When a customer order specifying one or more items 716 is received, or as a user 718 progresses through the facility 702, the corresponding items 716 may be selected or "picked" from the inventory locations 114 containing those items 716. In various implementations, item picking may range from manual to completely automated picking. For example, in one implementation, a user 718 may have a list of items 716 they desire and may progress through the facility 702 picking items 716 from inventory locations 114 within the storage area 706 and placing those items 716 into a cart 712. In other implementations, employees of the facility 702 may pick items 716 using written or electronic pick lists derived from customer orders. These picked items 716 may be placed into the cart 712 as the employee progresses through the facility 702.

After items 716 have been picked, the items 716 may be processed at a transition area 708. The transition area 708 may be any designated area within the facility 702 where items 716 are transitioned from one location to another or from one entity to another. For example, the transition area 708 may be a packing station within the facility 702. When the item 716 arrives at the transition area 708, the items 716 may be transitioned from the storage area 706 to the packing station. Information about the transition may be maintained by the inventory management system 118.

In another example, if the items 716 are departing the facility 702, a list of the items 716 may be obtained and used by the inventory management system 118 to transition responsibility for, or custody of, the items 716 from the facility 702 to another entity. For example, a carrier may accept the items 716 for transport with that carrier accepting responsibility for the items 716 indicated in the list. In another example, a user 718 may purchase or rent the items 716 and remove the items 716 from the facility 702. During use of the facility 702, the user 718 may move about the facility 702 to perform various tasks, such as picking or placing the items 716 in the inventory locations 114.

To facilitate operation of the facility 702, the inventory management system 118 is configured to use the sensor data 116 such as the item data, physical layout data, and so forth, to generate interaction data.

The interaction data may provide information about an interaction, such as a pick of an item 716 from the inventory location 114, a place of an item 716 to the inventory location 114, a touch made to an item 716 at the inventory location 114, a gesture associated with an item 716 at the inventory location 114, and so forth. The interaction data may include one or more of the type of interaction, interaction location identifier indicative of where from the inventory location 114 the interaction took place, item identifier, quantity change to the item 716, user identifier, and so forth. The interaction data may then be used to further update the item data. For example, the quantity of items 716 on hand at a particular lane on the platform may be changed based on an interaction that picks or places one or more items 716.

In one implementation, the sensor data 116 may be received by the inventory management module. The sensor data 116 may be processed to determine a weight change of +230 g occurred at position 2 on crossmember 104(3) at inventory location 114(73). The item data may indicate that items 716 of the type "12 oz can of Brand X dogfood" are stowed at this position and have an expected weight of 234 grams. Based on the sensor data 116 a hypothesis may be generated that indicates "Qty+1 (return) of 12 oz can of Brand X dogfood to position 2, crossmember 104(3), inventory location 114(73)". If the hypothesis has a confidence value that exceeds a threshold value, the hypothesis may be deemed to represent the interaction which took place. As a result, interaction data may be generated that is representative of this interaction.

As described above, the inventory management system 118 may perform other operations, determining inventory to restock, determining user billing data, and so forth.

Figure 8:
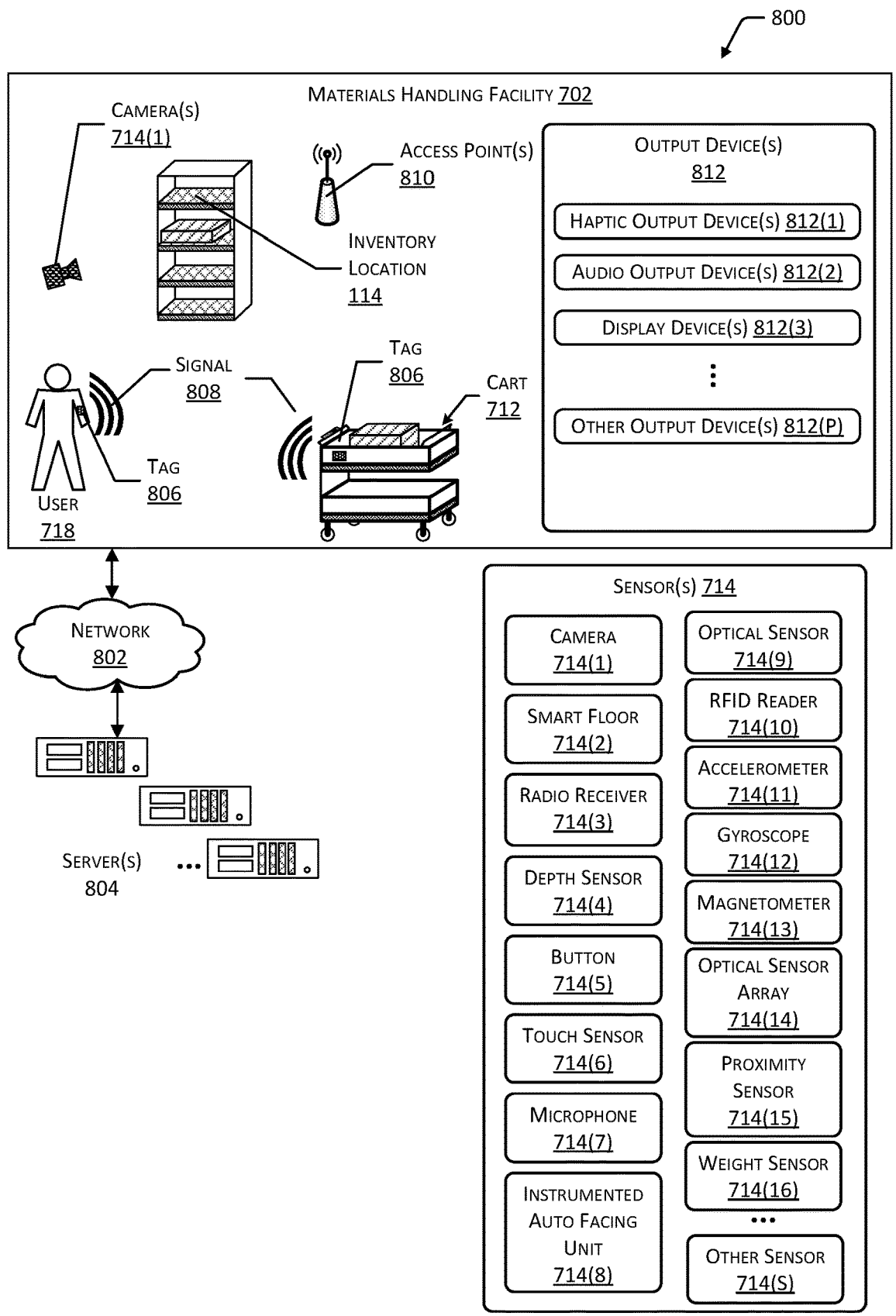
FIG. 8 is a block diagram illustrating additional details of the facility, according to some implementations.

FIG. 8 is a block diagram 800 illustrating additional details of the facility 702, according to some implementations. The facility 702 may be connected to one or more networks 802, which in turn connect to one or more computing devices, such as servers 804. The network 802 may include private networks such as an institutional or personal intranet, public networks such as the Internet, or a combination thereof. The network 802 may utilize wired technologies (e.g., wires, fiber optic cables, and so forth), wireless technologies (e.g., radio frequency, infrared, acoustic, optical, and so forth), or other connection technologies. The network 802 is representative of any type of communication network, including one or more of data networks or voice networks. The network 802 may be implemented using wired infrastructure (e.g., copper cable, fiber optic cable, and so forth), a wireless infrastructure (e.g., cellular, microwave, satellite, and so forth), or other connection technologies.

The servers 804 may be configured to execute one or more modules or software applications associated with the inventory management system 118 or other systems. While the servers 804 are illustrated as being in a location outside of the facility 702, in other implementations, at least a portion of the servers 804 may be located at the facility 702. The servers 804 are discussed in more detail below with regard to FIG. 9.

The user 718, the carts 712, items 716, or other objects in the facility 702 may be equipped with one or more tags 806. The tags 806 may be configured to emit a signal 808. In one implementation, the tag 806 may be a radio frequency identification (RFID) tag 806 configured to emit a RF signal 808 upon activation by an external signal. For example, the external signal may comprise a radio frequency signal or a magnetic field configured to energize or activate the RFID tag 806. In another implementation, the tag 806 may comprise a transmitter and a power source configured to power the transmitter. For example, the tag 806 may comprise a Bluetooth Low Energy (BLE) transmitter and battery. In other implementations, the tag 806 may use other techniques to indicate presence of the tag 806. For example, an acoustic tag 806 may be configured to generate an ultrasonic signal 808, which is detected by corresponding acoustic receivers. In yet another implementation, the tag 806 may be configured to emit an optical signal 808.

The inventory management system 118 may be configured to use the tags 806 for one or more of identification of the object, determining a location of the object, and so forth. For example, the user 718 may wear tags 806, the carts 712 may have tags 806 affixed, items 716 may have tags 806 affixed to their packaging, and so forth, which may be read and, based at least in part on signal strength, used to determine one or more of identity or location.

Generally, the inventory management system 118 or other systems associated with the facility 702 may include any number and combination of input components, output components, and servers 804.

The one or more sensors 714 may be arranged at one or more locations within the facility 702. For example, the sensors 714 may be mounted on or within a floor, wall, at a ceiling, at an inventory location 114, on a cart 712, may be carried or worn by a user 718, and so forth.

The sensors 714 may include one or more cameras 714(1) or other imaging sensors. The one or more cameras 714(1) may include imaging sensors configured to acquire images of a scene. The cameras 714(1) are configured to detect light in one or more wavelengths including, but not limited to, terahertz, infrared, visible, ultraviolet, and so forth. The cameras 714(1) may comprise charge coupled devices (CCD), complementary metal oxide semiconductor (CMOS) devices, microbolometers, and so forth. The inventory management system 118 may use image data acquired by the cameras 714(1) during operation of the facility 702. For example, the inventory management system 118 may identify items 716, users 718, carts 712, and so forth, based at least in part on their appearance within the image data acquired by the cameras 714(1). The cameras 714(1) may be mounted in various locations within the facility 702. For example, cameras 714(1) may be mounted overhead, on inventory locations 114, may be worn or carried by user 718, may be affixed to carts 712, and so forth.

The sensors 714 may include a smart floor 714(2). The smart floor 714(2) that is able to provide information about the location of objects, such as users 718, carts 712, and so forth. This information may include identifying the object, determining a location of the object, tracking the object, and so forth. The smart floor 714(2) may utilize smart floor devices that comprise one or more of transmitters or receivers that radiate or receive electromagnetic signals from antennas located at or underneath the floor. Based on information about what antenna radiated a signal and what antenna acquired the signal, information about an object on or above the floor may be determined. For example, the smart floor 714(2) may comprise sensing elements, or segments. Each segment may include an antenna that is coupled to one or more of a transmitter or a receiver. During operation, the segment may transmit an electromagnetic signal 808 that is radiated by the antenna, receive an electromagnetic signal that is acquired by the antenna, or both. In some implementations the smart floor 714(2) may operate as a physically large touch sensor that is deployed at floor level. The electromagnetic signals provide information about the presence of an object thereon. For example, the segments may electromagnetically couple to objects that are close by, allowing for the detection of objects that are either in contact with the floor or above the floor. In some implementations, instead of or in addition to the visual tracking of the object, the smart floor 714(2) may be used to provide object representation movement data as described below. For example, the output from the segments obtained during a particular window of time may be processed in a fashion similar to the image data.

One or more radio receivers 714(3) may also be included as sensors 714. In some implementations, the radio receivers 714(3) may be part of transceiver assemblies. The radio receivers 714(3) may be configured to acquire RF signals 808 associated with RFID, Wi-Fi, Bluetooth, ZigBee, 2G, 3G, 4G, LTE, or other wireless data transmission technologies. The radio receivers 714(3) may provide information associated with data transmitted via radio frequencies, signal strength of RF signals 808, and so forth. For example, information from the radio receivers 714(3) may be used by the inventory management system 118 to determine a location of an RF source, such as a transmitter carried by the user 718, a transmitter on the cart 712, a tag 806 on the item 716, and so forth.

One or more depth sensors 714(4) may also be included in the sensors 714. The depth sensors 714(4) are configured to acquire spatial or three-dimensional (3D) data, such as depth information, about objects within a field-of-view (FOV). The depth sensors 714(4) may include range cameras, lidar systems, sonar systems, radar systems, structured light systems, stereo vision systems, optical interferometry systems, and so forth. The inventory management system 118 may use the 3D data acquired by the depth sensors 714(4) to identify objects, determine a location of an object in 3D real space, identify a user 718, and so forth.

One or more buttons 714(5) may be configured to accept input from the user 718. The buttons 714(5) may comprise mechanical, capacitive, optical, or other mechanisms. For example, the buttons 714(5) may comprise mechanical switches configured to accept an applied force from a touch of the user 718 to generate an input signal. The inventory management system 118 may use data from the buttons 714(5) to receive information from the user 718. For example, the cart 712 may be configured with a button 714(5) to accept input from the user 718 and send information indicative of the input to the inventory management system 118.

The sensors 714 may include one or more touch sensors 714(6). The touch sensors 714(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 118 may use data from the touch sensors 714(6) to receive information from the user 718. For example, the touch sensor 714(6) may be integrated with the cart 712 to provide a touchscreen with which the user 718 may select from a menu one or more particular items 716 for picking, enter a manual count of items 716 at an inventory location 114, and so forth.

One or more microphones 714(7) may be configured to acquire information indicative of sound present in the environment. In some implementations, arrays of microphones 714(7) may be used. These arrays may implement beamforming techniques to provide for directionality of gain. The inventory management system 118 may use the one or more microphones 714(7) to acquire information from acoustic tags 806, accept voice input from the user 718, determine ambient noise level, and so forth.

The sensors 714 may include instrumented auto facing units (IAFUs) 714(8). The IAFU 714(8) may comprise a position sensor configured to provide data indicative of displacement of a pusher. As an item 716 is removed from the IAFU 714(8), the pusher moves, such as under the influence of a spring, and pushes the remaining items 716 in the IAFU 714(8) to the front of the inventory location 114. By using data from the position sensor, and given item data such as a depth of an individual item 716, a count may be determined, based on a change in position data. For example, if each item 716 is 1 inch deep, and the position data indicates a change of 8 inches, the quantity held by the IAFU 714(8) may have changed by 8 items 716. This count information may be used to confirm or provide a cross check for a count obtained by other means, such as analysis of the sensor data 116 from the weight sensors 714(16).

The sensors 714 may include one or more optical sensors 714(9). The optical sensors 714(9) may be configured to provide data indicative of one or more of color or intensity of light impinging thereupon. For example, the optical sensor 714(9) may comprise a photodiode and associated circuitry configured to generate a signal 808 or data indicative of an incident flux of photons. As described below, the optical sensor array 714(14) may comprise a plurality of the optical sensors 714(9). The optical sensors 714(9) may include photodiodes, photoresistors, photovoltaic cells, quantum dot photoconductors, bolometers, pyroelectric infrared detectors, and so forth. For example, the optical sensor 714(9) may use germanium photodiodes to detect infrared light.

One or more radio frequency identification (RFID) readers 714(10), near field communication (NFC) systems, and so forth, may be included as sensors 714. For example, the RFID readers 714(10) may be configured to read the RF tags 806. Information acquired by the RFID reader 714(10) may be used by the inventory management system 118 to identify an object associated with the RF tag 806 such as the item 716, the user 718, the cart 712, and so forth. For example, based on information from the RFID readers 714(10) detecting the RF tag 806 at a particular inventory location, an item 716 being placed or picked may be determined.

The sensors 714 may include one or more accelerometers 714(11), which may be worn or carried by the user 718, mounted to the cart 712, and so forth. The accelerometers 714(11) may provide information such as the direction and magnitude of an imposed acceleration. Data such as rate of acceleration, determination of changes in direction, speed, and so forth, may be determined using the accelerometers 714(11).

A gyroscope 714(12) may provide information indicative of rotation of an object affixed thereto. For example, the cart 712 or other objects may be equipped with a gyroscope 714(12) to provide data indicative of a change in orientation of the object.

A magnetometer 714(13) may be used to determine an orientation by measuring ambient magnetic fields, such as the terrestrial magnetic field. The magnetometer 714(13) may be worn or carried by the user 718, mounted to the cart 712, and so forth. For example, the magnetometer 714(13) mounted to the cart 712 may act as a compass and provide information indicative of which direction the cart 712 is oriented.

An optical sensor array 714(14) may comprise one or optical sensors 714(9). The optical sensors 714(9) may be arranged in a regular, repeating, or periodic two-dimensional arrangement such as a grid. The optical sensor array 714(14) may generate image data. For example, the optical sensor array 714(14) may be arranged within or below an inventory location 114 and obtain information about shadows of items 716, hand of the user 718, and so forth.

The sensors 714 may include proximity sensors 714(15) used to determine presence of an object, such as the user 718, the cart 712, and so forth. The proximity sensors 714(15) may use optical, electrical, ultrasonic, electromagnetic, or other techniques to determine a presence of an object. In some implementations, the proximity sensors 714(15) may use an optical emitter and an optical detector to determine proximity. For example, an optical emitter may emit light, a portion of which may then be reflected by the object back to the optical detector to provide an indication that the object is proximate to the proximity sensor 714(15). In other implementations, the proximity sensors 714(15) may comprise a capacitive proximity sensor 714(15) configured to provide an electrical field and determine a change in electrical capacitance due to presence or absence of an object within the electrical field.

The proximity sensors 714(15) may be configured to provide sensor data 116 indicative of one or more of a presence or absence of an object, a distance to the object, or characteristics of the object. An optical proximity sensor 714(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 714 such as a camera 714(1). Based on an apparent distance between the features of the structured light pattern, the distance to the object may be calculated. Other techniques may also be used to determine distance to the object. In another example, the color of the reflected light may be used to characterize the object, such as skin, clothing, cart 712, and so forth.

The one or more weight sensors 714(16) are configured to measure the weight of a load, such as the item 716, the cart 712, or other objects. The weight sensors 714(16) may be configured to measure the weight of the load at one or more of the inventory locations 114, the cart 712, on the floor of the facility 702, and so forth. For example, a platform of the inventory location 114 may include a plurality of weight sensors 714(16). The weight sensors 714(16) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 714(16) may operate as transducers that generate one or more signals based on an applied force, such as that of the load due to gravity. For example, the weight sensor 714(16) may comprise a weight sensor 106 having a strain gauge 108 and a structural member that deforms slightly when weight is applied. By measuring a change in the electrical characteristic of the strain gauge 108, such as capacitance or resistance, the weight may be determined. In another example, the weight sensor 714(16) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 118 may use the data acquired by the weight sensors 714(16) to identify an object, determine a change in the quantity of objects, determine a location of an object, maintain shipping records, and so forth.

The sensors 714 may include other sensors 714(S) as well. For example, the other sensors 714(S) may include light curtains, ultrasonic rangefinders, thermometers, barometric sensors, hygrometers, and so forth.

In some implementations, the sensors 714 may include hardware processors, memory, and other elements configured to perform various functions. For example, the cameras 714(1) may be configured to generate image data, send the image data to another device such as the server 804, and so forth.

The facility 702 may include one or more access points 810 configured to establish one or more wireless networks. The access points 810 may use Wi-Fi, NFC, Bluetooth, or other technologies to establish wireless communications between a device and the network 802. The wireless networks allow the devices to communicate with one or more of the sensors 714, the inventory management system 118, the tags 806, a communication device of the cart 712, or other devices.

Output devices 812 may also be provided in the facility 702. The output devices 812 are configured to generate signals 808, which may be perceived by the user 718 or detected by the sensors 714. In some implementations, the output devices 812 may be used to provide illumination of the optical sensor array 714(14).

Haptic output devices 812(1) are configured to provide a signal 808 that results in a tactile sensation to the user 718. The haptic output devices 812(1) may use one or more mechanisms such as electrical stimulation or mechanical displacement to provide the signal 808. For example, the haptic output devices 812(1) may be configured to generate a modulated electrical signal, which produces an apparent tactile sensation in one or more fingers of the user 718. In another example, the haptic output devices 812(1) may comprise piezoelectric or rotary motor devices configured to provide a vibration, which may be felt by the user 718.

One or more audio output devices 812(2) may be configured to provide acoustic output. The acoustic output includes one or more of infrasonic sound, audible sound, or ultrasonic sound. The audio output devices 812(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 812(3) may be configured to provide output, which may be seen by the user 718 or detected by a light-sensitive sensor such as a camera 714(1) or an optical sensor 714(9). In some implementations, the display devices 812(3) may be configured to produce output in one or more of infrared, visible, or ultraviolet light. The output may be monochrome or in color. The display devices 812(3) may be one or more of emissive, reflective, microelectromechanical, and so forth. An emissive display device 812(3), such as using LEDs, is configured to emit light during operation. In comparison, a reflective display device 812(3), such as using an electrophoretic element, relies on ambient light to present an image. Backlights or front lights may be used to illuminate non-emissive display devices 812(3) to provide visibility of the output in conditions where the ambient light levels are low.

The display devices 812(3) may be located at various points within the facility 702. For example, the addressable displays may be located on inventory locations 114, carts 712, on the floor of the facility 702, and so forth.

Other output devices 812(P) may also be present. For example, the other output devices 812(P) may include scent/odor dispensers, document printers, 3D printers or fabrication equipment, and so forth.

Figure 9:
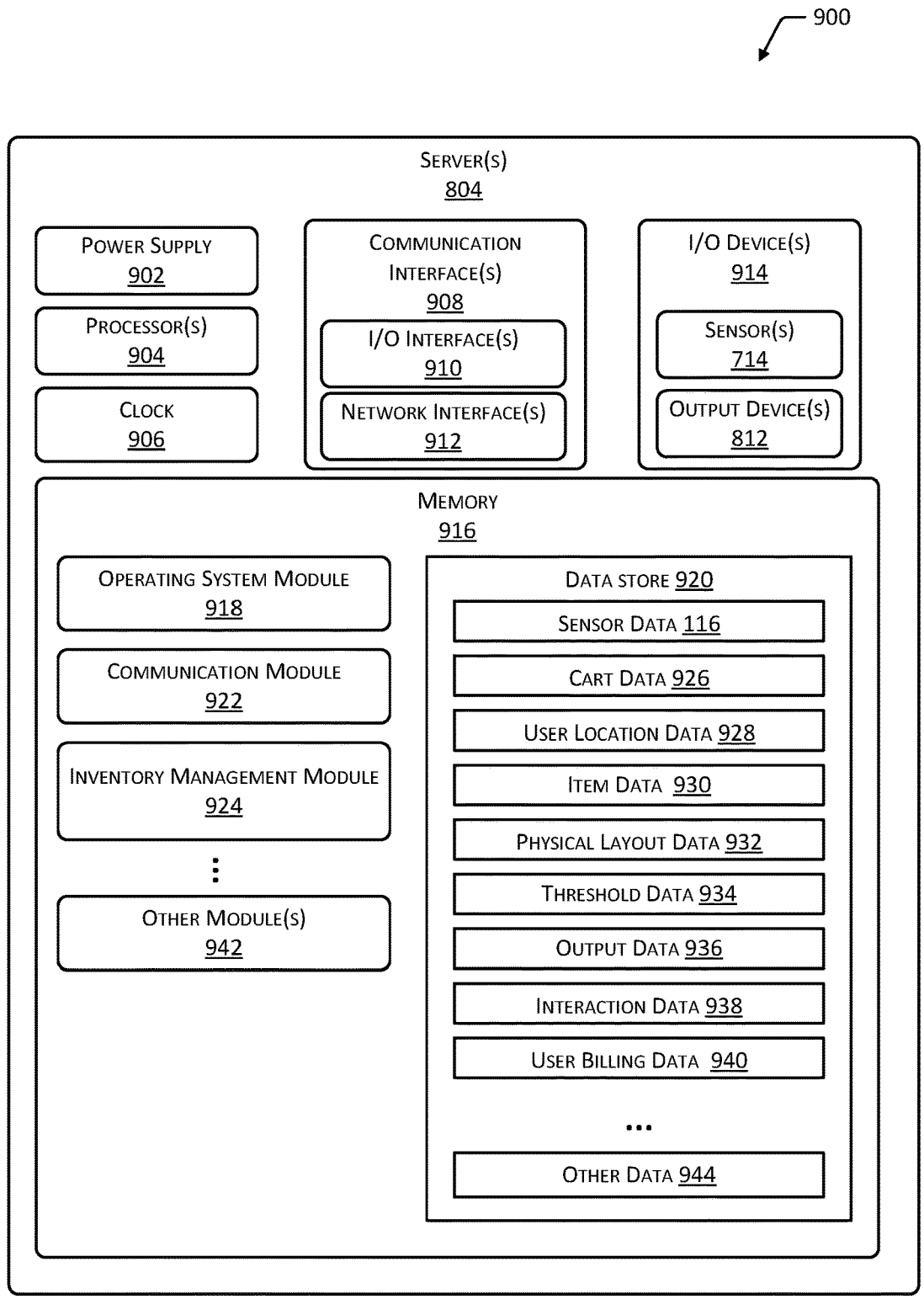
FIG. 9 is a block diagram of a server to support operation of the facility, according to some implementations.

FIG. 9 illustrates a block diagram 900 of a server 804 configured to support operation of the facility 702, according to some implementations. The server 804 may be physically present at the facility 702, may be accessible by the network 802, or a combination of both. The server 804 does not require end-user knowledge of the physical location and configuration of the system that delivers the services. Common expressions associated with the server 804 may include "on-demand computing", "software as a service (SaaS)", "platform computing", "network-accessible platform", "cloud services", "data centers", and so forth. Services provided by the server 804 may be distributed across one or more physical or virtual devices.

One or more power supplies 902 may be configured to provide electrical power suitable for operating the components in the server 804. The one or more power supplies 902 may comprise batteries, capacitors, fuel cells, photovoltaic cells, wireless power receivers, conductive couplings suitable for attachment to an external power source such as provided by an electric utility, and so forth. The server 804 may include one or more hardware processors 904 (processors) configured to execute one or more stored instructions. The processors 904 may comprise one or more cores. One or more clocks 906 may provide information indicative of date, time, ticks, and so forth. For example, the processor 904 may use data from the clock 906 to associate a particular interaction with a particular point in time.

The server 804 may include one or more communication interfaces 908 such as input/output (I/O) interfaces 910, network interfaces 912, and so forth. The communication interfaces 908 enable the server 804, or components thereof, to communicate with other devices or components. The communication interfaces 908 may include one or more I/O interfaces 910. The I/O interfaces 910 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include input devices such as one or more of a sensor 714, keyboard, mouse, scanner, and so forth. The I/O devices 914 may also include output devices 812 such as one or more of a display device 812(3), printer, audio speakers, and so forth. In some embodiments, the I/O devices 914 may be physically incorporated with the server 804 or may be externally placed.

The network interfaces 912 may be configured to provide communications between the server 804 and other devices, such as the carts 712, routers, access points 810, and so forth. The network interfaces 912 may include devices configured to couple to personal area networks (PANS), local area networks (LANs), wireless local area networks (WLANS), wide area networks (WANs), and so forth. For example, the network interfaces 912 may include devices compatible with Ethernet, Wi-Fi, Bluetooth, ZigBee, and so forth.

The server 804 may also include one or more busses or other internal communications hardware or software that allow for the transfer of data between the various modules and components of the server 804.

As shown in FIG. 9, the server 804 includes one or more memories 916. The memory 916 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 916 provides storage of computer-readable instructions, data structures, program modules, and other data for the operation of the server 804. A few example functional modules are shown stored in the memory 916, although the same functionality may alternatively be implemented in hardware, firmware, or as a system on a chip (SoC).

The memory 916 may include at least one operating system (OS) module 918. The OS module 918 is configured to manage hardware resource devices such as the I/O interfaces 910, the I/O devices 914, the communication interfaces 908, and provide various services to applications or modules executing on the processors 904. The OS module 918 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 916 may be a data store 920 and one or more of the following modules. These modules may be executed as foreground applications, background tasks, daemons, and so forth. The data store 920 may use a flat file, database, linked list, tree, executable code, script, or other data structure to store information. In some implementations, the data store 920 or a portion of the data store 920 may be distributed across one or more other devices including the servers 804, network attached storage devices, and so forth.

A communication module 922 may be configured to establish communications with one or more of the carts 712, sensors 714, display devices 812(3), other servers 804, or other devices. The communications may be authenticated, encrypted, and so forth.

The memory 916 may store an inventory management module 924. The inventory management module 924 is configured to provide the inventory functions as described herein with regard to the inventory management system 118. For example, the inventory management module 924 may track items 716 between different inventory locations 114, to and from the carts 712, generate restocking orders, direct operation of robots within the facility 702, and so forth. The inventory management module 924 may access sensor data 116 including weight change data, strain change values, image data, received data, and so forth.

Information used by the inventory management module 924 may be stored in the data store 920. For example, the data store 920 may be used to store the sensor data 116, cart data 926, user location data 928, the item data 930, the physical layout data 932, threshold data 934, output data 936, interaction data 938, user billing data 940, and so forth.

The cart data 926 comprises information about the items 716 that are determined to be in the custody of the user 718. For example, the cart data 926 may indicate the items 716 that are within the cart 712 that is associated with the account of the user 718, currently being carried by the user 718, and so forth. The cart data 926 may be based at least in part on the interaction data 938. For example, the interaction data 938 may be associated with a particular user 718, changing the contents of the cart data 926 based on the interaction.

The inventory management module 924 may generate the user location data 928 that is indicative of the location of the user 718 within the facility 702. For example, the inventory management module 924 may use image data obtained by the cameras 714(1) to determine a location of the user 718. In other implementations, other techniques may be used for determining the user location data 928. For example, data from the smart floor 714(2) may be used to determine the location of the user 718. Based on the user location data 928 and the interaction data 938, a particular interaction may be associated with an account of a particular user 718. For example, if the user location data 928 indicates that the user 718 is present in front of inventory location 114(492) at time 17:47:20 and the interaction data 938 indicates a pick of a quantity of one item 716(27) from the position on a crossmember 502 associated with accessory 112 at inventory location 114(492) at 17:47:27, the user 718 may be billed for that pick.

The data store 920 may store item data 930 that comprises information about a particular type of item 716. The item data 930 may include information indicative of a weight of a single item 716, or a package, kit, or other grouping considered to be a single item 716. The item data 930 may include other characteristics of the type of item 716 such as: physical dimensions, characteristics about how the item 716 appears, and so forth. The item data 930 may indicate the types and quantities of items 716 that are expected to be stored at a particular area at a particular inventory location 114. The item data 930 may include other data. For example, the other data may comprise weight distribution of the item 716, and so forth. The item data 930 may also be associated with the physical layout data 932. For example, the item data 930 may indicate that a particular type of item 716 is stowed at a particular accessory 112 in a particular position on a particular crossmember 502.

The data store 920 may store physical layout data 932 that provides information indicative of where inventory locations 114 are in the facility, location of sensors 714, information about sensor orientation and field of view (where applicable), and so forth. For example, the physical layout data 932 may comprise information representative of a map or floor plan of the facility 702 with relative positions of inventory locations 114, accessories 112 within those inventory locations 114, and so forth. In some implementations the physical layout data 932 may include planogram data indicative of how types of items 716 are to be arranged at the inventory locations 114, location of the areas, and so forth.

The physical layout data 932 may also comprise information about the type of inventory location 114 in use, information indicative of the physical configuration or placement of accessories 112, strain gauges 108, weight sensors 106, and so forth. For example, the physical layout data 932 may indicate that a particular model of crossmember 104 is in use at a particular inventory location 114. Using this information, data about the relative position of the weight sensors 106 and strain gauges 108 with respect to the crossmember 104 may be retrieved and used to generate output data 936. The inventory management module 924 may utilize the physical layout data 932 during operation.

The threshold data 934 comprises the various thresholds used by the system. For example, the threshold data 934 may specify values for confidence thresholds that are used to determine if a hypothesis is deemed suitable to be used to generate the interaction data 938.

During operation, electronics associated with the inventory location 114 or the inventory management module 924 may determine output data 936. The output data 936 may be indicative of a detection of a weight change at a particular accessory 112, may be indicative of a weight change value for a particular accessory 112, and so forth.

As described above, the interaction data 938 may provide information about an interaction, such as a pick of an item 716 from the inventory location 114, a place of an item 716 to the inventory location 114, a touch made to an item 716 at the inventory location 114, a gesture associated with an item 716 at the inventory location 114, and so forth. The interaction data 938 may include one or more of the type of interaction, interaction location identifier indicative of where from the inventory location 114 the interaction took place, item identifier, quantity change to the item 716, user identifier, and so forth.

The inventory management module 924 may generate user billing data 940 based on the cart data 926. For example, when a user 718 leaves the facility 702, the items in the cart data 926 and their respective quantities may be used to generate user billing data 940. In some implementations, the user billing data 940 may be used to bill a payment account associated with the user 718.

The inventory management module 924 may process the sensor data 116 and generate other data. For example, based on the interaction data 938, a quantity of a type of item 716 at a particular inventory location 114 may drop below a threshold restocking level. The system may generate data comprising a restocking order indicative of the inventory location 114, the area, and a quantity needed to replenish stock to a predetermined level. The restocking order may then be used to direct a robot to restock that inventory location 114.

Other modules 942 may also be present in the memory 916 as well as other data 944 in the data store 920.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
   a crossmember comprising:
     a first end;
     a second end;
     a first strain gauge affixed to the crossmember at a first location between the first end and the second end; and
     a second strain gauge affixed to the crossmember at a second location between the first end and the second end;
   a first load cell supporting the first end of the crossmember;
   a second load cell supporting the second end of the crossmember;
   a first accessory comprising a first engagement feature to mechanically engage a portion of the crossmember that is between the first end and the second end and is proximate to the first strain gauge;
   a first vertical support coupled to the first load cell;
   a second vertical support coupled to the second load cell; and
   one or more hardware processors to execute instructions to:
     determine, based on data from the first load cell and the second load cell, a weight change at the crossmember from a first time to a second time;
     determine a first strain change value at the first strain gauge from the first time to the second time;
     determine a second strain change value at the second strain gauge from the first time to the second time; and
     determine a position on the crossmember associated with the weight change based on one or more of the first strain change value or the second strain change value.

2. The device of claim 1, the crossmember further comprising:
   a first strain concentration feature proximate to the first strain gauge, wherein the first strain concentration feature comprises one or more of a hole, a slot, a notch, a groove, a rib, a gusset, a boss, a transition from a first thickness to a second thickness, a cut, a ridge, or a plate; and
   a second strain concentration feature proximate to the second strain gauge, wherein the second strain concentration feature comprises one or more of a hole, a slot, a notch, a groove, a rib, a gusset, a boss, a transition from a first thickness to a second thickness, a cut, a ridge, or a plate.

3. A system comprising:
   a first device comprising:
     a crossmember comprising:
       a first end;
       a second end; and
       a plurality of strain gauges affixed to the crossmember between the first end and the second end; and
     one or more weight sensors attached to the crossmember, wherein a weight of the crossmember and a load on the crossmember is supported by the one or more weight sensors; and
   a second device comprising:
     one or more hardware processors to execute instructions to:
       for each strain gauge in the plurality of strain gauges:
         determine a first strain value at a first time;
         determine a second strain value at a second time; and
         determine a strain change value based on a difference between the first strain value and the second strain value.

4. The system of claim 3, the crossmember further comprising:
   one or more features proximate to individual ones of the plurality of strain gauges, wherein the one or more features comprise one or more of: a hole, a slot, a notch, a groove, a rib, a gusset, a boss, a transition from a first thickness to a second thickness, a cut, a ridge, or a plate.

5. The system of claim 3, the crossmember further comprising:
   a first side, a second side, and a third side arranged to provide a U-shaped cross section; and
   wherein:
   the first side contains one or more separate sections, the second side is contiguous, and the third side contains one or more separate sections aligned with the one or more separate sections of the first side;
   the second side having an interior side in an interior of the U-shaped cross section and an exterior side; and
   individual ones of the plurality of strain gauges are affixed to the interior side of the second side proximate to divisions between the one or more separate sections of the first side and the third side.

6. The system of claim 3, wherein the plurality of strain gauges are affixed to a carrier substrate that is then affixed to the crossmember using an adhesive.

7. The system of claim 3, wherein individual ones of the plurality of strain gauges are evenly spaced between the first end and the second end.

8. The system of claim 3, the crossmember further comprising:
   a plurality of engagement features; and
   wherein individual ones of the plurality of strain gauges are affixed to the crossmember proximate to individual ones of the plurality of engagement features.

9. The system of claim 3, the crossmember further comprising:

a plurality of perpendicular engagement features that extend away from the crossmember; and wherein individual ones of the plurality of strain gauges are affixed to a portion of an individual one of the plurality of perpendicular engagement features proximate to where individual ones of the plurality of perpendicular engagement features join the crossmember.

10. The system of claim 3, the one or more weight sensors comprising:

a first weight sensor attached to the first end of the crossmember; and a second weight sensor attached to the second end of the crossmember.

11. The system of claim 3, further comprising one or more accessories, each accessory comprising:

a first engagement feature to mechanically engage a portion of the crossmember; and one or more of a hook, a shelf, a bin, or a basket.

12. The system of claim 3, the crossmember further comprising:

a plate having a first end and a second end;

a first fastener that mechanically couples the first end of the plate to the crossmember;

a second fastener that mechanically affixes the second end of the plate to the crossmember; and wherein at least one of the plurality of strain gauges is affixed to the plate.

13. The system of claim 3, the crossmember further comprising:

a non-load bearing first member that extends from a portion of the crossmember and maintains thermal conductivity with the crossmember; and a reference strain gauge affixed to the non-load bearing first member.

14. The system of claim 3, the one or more hardware processors to further execute the instructions to:

determine, based on output from the one or more weight sensors at the first time, a first total weight;

determine, based on output from the one or more weight sensors at the second time, a second total weight;

determine a total weight change by subtracting the first total weight from the second total weight;

determine a total strain change value by summing the differences determined for the each strain gauge in the plurality of strain gauges; and for the each strain gauge in the plurality of strain gauges:
determine a relative value of the each strain gauge by dividing the difference determined for the each strain gauge by the total strain change value; and
determine a weight change associated with the each strain gauge by multiplying the total weight change by the relative value of the each strain gauge.

15. The system of claim 3, the one or more hardware processors to further execute the instructions to:

determine a set of strain change values that are based on the strain change values for the each of the strain gauges in the plurality of strain gauges;

determine a maximum strain change value in the set of strain change values;

determine a strain gauge associated with the maximum strain change value, wherein the strain gauge is located at a first position on the crossmember; and generate data indicative of a change at a location on the crossmember at the first position.

16. A method comprising:

determining, based on output from a weight sensor that supports a crossmember, a first total weight at a first time;

determining, based on the output from the weight sensor that supports the crossmember, a second total weight at a second time;

determining a total weight change based on the first total weight and the second total weight;

determining, at the first time, a first strain value associated with a first strain gauge affixed to the crossmember at a first position;

determining, at the first time, a second strain value associated with a second strain gauge affixed to the crossmember at a second position;

determining, at the second time, a third strain value associated with the first strain gauge;

determining, at the second time, a fourth strain value associated with the second strain gauge;

determining a first strain change value based on the first strain value and the third strain value;

determining a second strain change value based on the second strain value and the fourth strain value;

determining a first relative value based on the first strain change value and the second strain change value;

determining a second relative value based on the first strain change value and the second strain change value; and generating output data based on the total weight change and one or more of the first relative value or the second relative value.

17. The method of claim 16, further comprising:

determining a total strain change value by summing the first strain change value and the second strain change value;

wherein the determining the first relative value comprises dividing the first strain change value by the total strain change value; and wherein the determining the second relative value comprises dividing the second strain change value by the total strain change value.

18. The method of claim 16, further comprising:

determining a first weight change at the first position by multiplying the total weight change and the first relative value;

determining a second weight change at the second position by multiplying the total weight change and the second relative value; and wherein the output data is indicative of one or more of the first weight change or the second weight change.

19. The method of claim 16, further comprising:

determining that the first relative value is greater than the second relative value; and wherein the output data is indicative of a change in weight at the first position.

20. The method of claim 16, further comprising:

determining that the first relative value is greater than the second relative value;

determining a difference between the first strain change value and the second strain change value is greater than a threshold value; and wherein the output data is indicative of a weight change at the first position and not the second position.

* * * * *